US009276417B2

(12) United States Patent
Yoshida

(10) Patent No.: US 9,276,417 B2
(45) Date of Patent: Mar. 1, 2016

(54) BATTERY CONTROL SYSTEM, BATTERY PACK, ELECTRONIC DEVICE AND CHARGER

(71) Applicant: NEC ENERGY DEVICES, LTD., Kanagawa (JP)

(72) Inventor: Tadahiro Yoshida, Kanagawa (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 9 days.

(21) Appl. No.: 14/378,912

(22) PCT Filed: Feb. 8, 2013

(86) PCT No.: PCT/JP2013/000708
§ 371 (c)(1),
(2) Date: Aug. 14, 2014

(87) PCT Pub. No.: WO2013/128808
PCT Pub. Date: Sep. 6, 2013

(65) Prior Publication Data
US 2014/0370940 A1    Dec. 18, 2014

(30) Foreign Application Priority Data

Feb. 29, 2012  (JP) ................. 2012-044629

(51) Int. Cl.
*H02J 7/04*  (2006.01)
*H01M 10/44*  (2006.01)
(Continued)

(52) U.S. Cl.
CPC ............... *H02J 7/0021* (2013.01); *G06F 1/324* (2013.01); *H01M 10/425* (2013.01);
(Continued)

(58) Field of Classification Search
CPC ............... H02J 7/02; H02J 7/10; H02J 7/04; H02J 7/0014; H02J 7/007; H02J 7/0016; H02J 7/0021; H02J 7/0026; H02J 7/0091; H01M 10/48; H01M 10/44; H01M 10/42; H01M 2010/4271; H01M 10/425; H01M 10/482; H01M 10/486; G01R 31/3606

USPC ........... 455/572, 573, 571, 574, 127.1, 343.1; 320/134, 136, 107, 118; 702/63; 307/38, 52

See application file for complete search history.

(56) References Cited

U.S. PATENT DOCUMENTS 7,514,905 B2 *   4/2009  Kawahara ........... B60L 11/1864
                                                   320/150
8,436,588 B2 *   5/2013  Morina ................. H02J 7/0013
                                                   320/116

(Continued)

FOREIGN PATENT DOCUMENTS

JP    2001-145273 A    5/2001
JP    2003-217679 A    7/2003

(Continued)

OTHER PUBLICATIONS

International Search Report of PCT/JP2013/000708 dated Mar. 26, 2013 [PCT/ISA/210].

*Primary Examiner* — Pablo Tran
(74) *Attorney, Agent, or Firm* — Sughrue Mion, PLLC

(57) ABSTRACT

A plurality of battery cells (100) are connected in series to each other. A temperature measurement unit (300) measures temperatures of two or more battery cells (100). A battery control unit (400) controls charge and discharge of the battery cells (100) on the basis of the temperatures measured by the temperature measurement unit (300). In addition, when the charge of the battery cells (100) is performed or the discharge of the battery cells (100) is performed, the battery control unit (400) specifies a lowest temperature cell having the lowest temperature and a highest temperature cell having the highest temperature, on the basis of the temperatures measured by the temperature measurement unit (300). In addition, the battery control unit (400) continues the charge or discharge, as it is, when a first condition in which a temperature difference ΔT between the highest temperature cell and the lowest temperature cell is equal to or greater than a reference value $T_1$ is not satisfied. On the other hand, when the temperature difference ΔT satisfies the first condition, the battery control unit (400) outputs a first signal.

32 Claims, 18 Drawing Sheets

(51) Int. Cl.
*H01M 10/48* (2006.01)
*H02J 7/00* (2006.01)
*H01M 10/42* (2006.01)
*G06F 1/32* (2006.01)
*H04M 1/02* (2006.01)
*H05B 37/02* (2006.01)
*H01M 10/0525* (2010.01)

(52) U.S. Cl.
CPC ......... *H01M 10/441* (2013.01); *H01M 10/443* (2013.01); *H01M 10/482* (2013.01); *H01M 10/486* (2013.01); *H02J 7/0026* (2013.01); *H02J 7/0029* (2013.01); *H02J 7/0091* (2013.01); *H04M 1/0202* (2013.01); *H05B 37/0209* (2013.01); *H01M 10/0525* (2013.01); *H01M 2010/4271* (2013.01); *H01M 2010/4278* (2013.01); *H04M 2001/0204* (2013.01); *Y02T 10/7055* (2013.01); *Y10T 307/461* (2015.04); *Y10T 307/549* (2015.04)

(56) References Cited

U.S. PATENT DOCUMENTS

| | | | |
|---|---|---|---|
| 8,738,310 B2 * | 5/2014 | Swanton | G01R 31/3679 324/600 |
| 9,059,596 B2 * | 6/2015 | Chou | H02J 7/0091 |
| 9,126,488 B2 * | 9/2015 | Hiroe | H01M 10/443 |
| 2006/0076921 A1 | 4/2006 | Kubota et al. | |
| 2013/0085695 A1 * | 4/2013 | Ono | H01M 10/48 702/63 |
| 2014/0176041 A1 * | 6/2014 | Sun | H01L 35/30 320/101 |
| 2014/0375231 A1 * | 12/2014 | Suzuki | B60L 11/1861 318/139 |
| 2015/0008885 A1 * | 1/2015 | Yoshida | H01M 10/425 320/134 |
| 2015/0025825 A1 * | 1/2015 | Yoshida | G01R 31/3624 702/63 |
| 2015/0035495 A1 * | 2/2015 | Yoshida | H01M 10/425 320/134 |
| 2015/0180092 A1 * | 6/2015 | Nakagiri | H01M 10/441 320/118 |
| 2015/0188203 A1 * | 7/2015 | Enomoto | H01M 10/6568 429/83 |

FOREIGN PATENT DOCUMENTS

| | | |
|---|---|---|
| JP | 2005-005181 A | 1/2005 |
| JP | 2006-101657 A | 4/2006 |
| JP | 2007-325458 A | 12/2007 |

* cited by examiner

FIG. 4
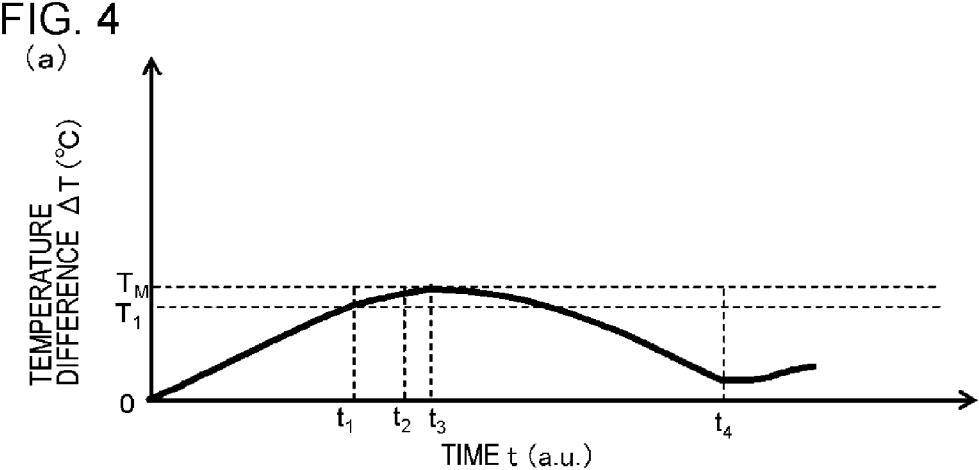
(a)
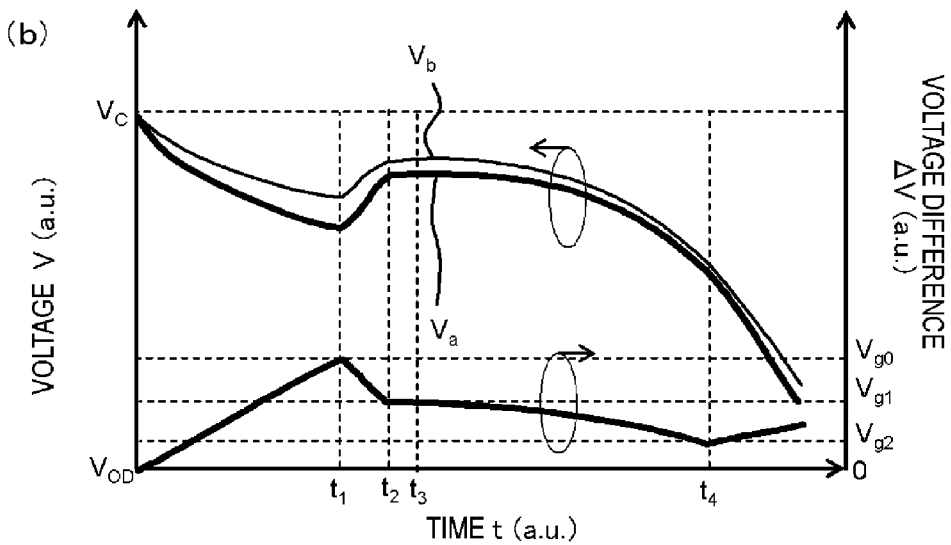
(b)
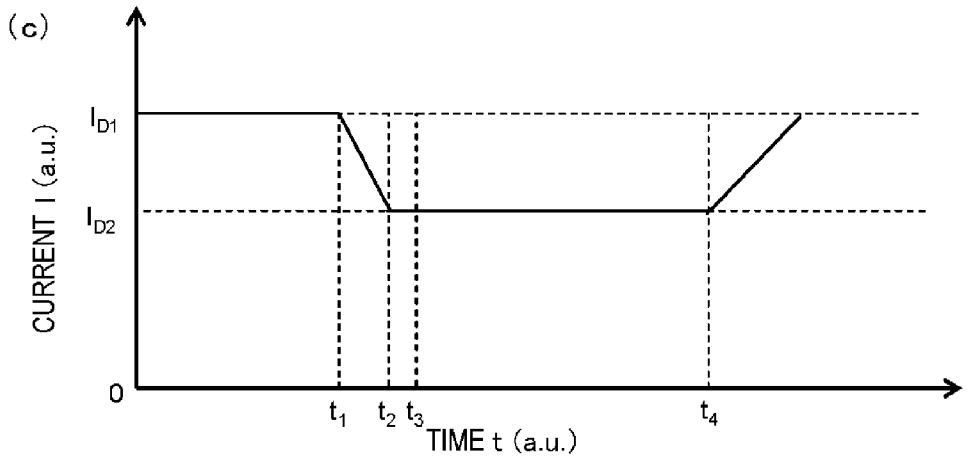
(c)

FIG. 5
(a)
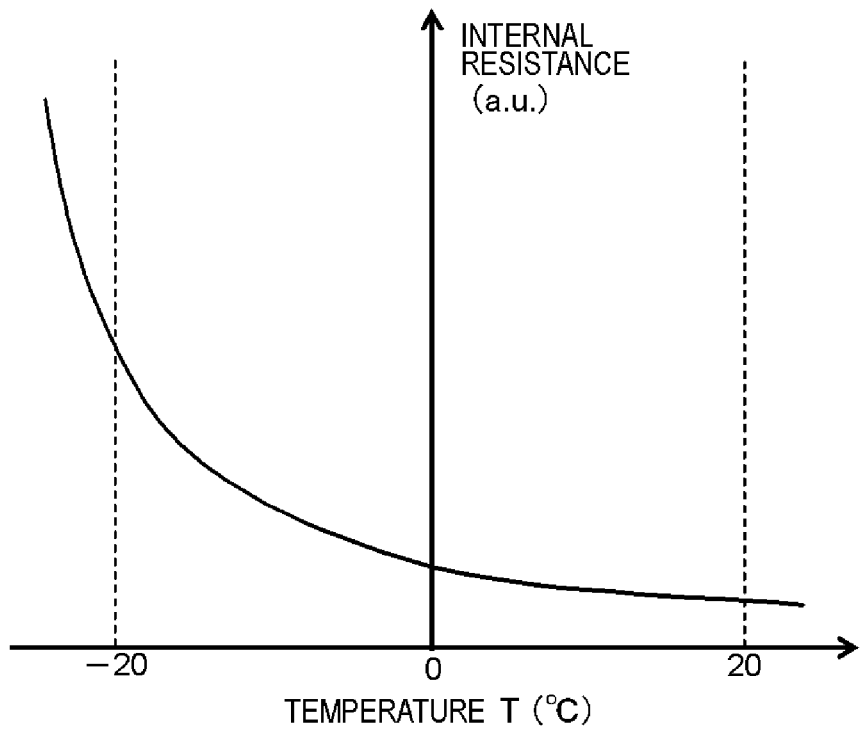
(b)
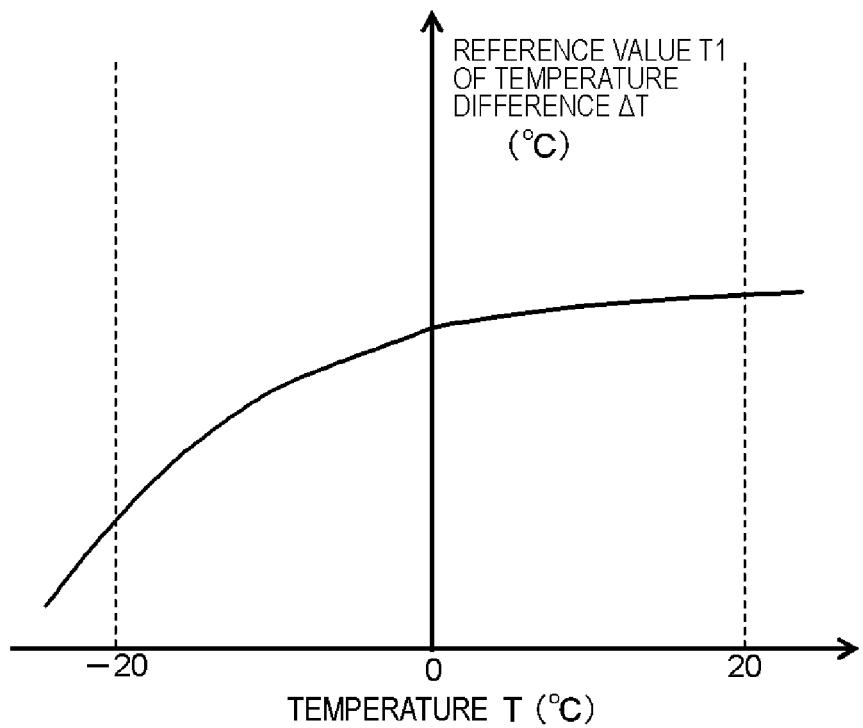

BATTERY CONTROL SYSTEM, BATTERY PACK, ELECTRONIC DEVICE AND CHARGER

CROSS REFERENCE TO RELATED APPLICATIONS

This is a National Stage of International Application No. PCT/JP2013/000708 filed Feb. 8, 2013, claiming priority based on Japanese Patent Application No. 2012-044629 filed Feb. 29, 2012, the contents of all of which are incorporated herein by reference in their entirety.

TECHNICAL FIELD

The present invention relates to a battery control system, a battery pack, an electronic device and a charger.

BACKGROUND ART

Various methods for stably obtaining power from a battery pack are proposed.

Patent Document 1 (Japanese Unexamined Patent Publication No. 2003-217679) discloses the following discharge method. Whenever a battery voltage drops to a discharge termination voltage during discharge of a secondary battery, the secondary battery is intermittently discharged while repeating a temporary stop. In this case, when the discharge is restarted after a temporary stop, the discharge is performed while a current is reduced in a stepwise manner. Thereby, compared to a case where high-rate discharge is performed continuously, it is possible to extract a great deal of power from a secondary battery.

RELATED DOCUMENT

Patent Document

[Patent Document 1] Japanese Unexamined Patent Publication No. 2003-217679

DISCLOSURE OF THE INVENTION

The inventor has found that the following problem occurs in a battery pack having a plurality of battery units which are connected in series to each other. The voltages of the respective battery units are not necessarily equal to each other due to various causes. For this reason, when the voltage of any of the battery units reaches an over-discharge detection voltage value during discharge of the battery pack, the discharge is terminated at this timing. In this case, there has been the possibility of the discharge being terminated in a state where a residual capacity of all the battery units remains.

According to the present invention, there is provided a battery control system including: a temperature measurement unit that measures temperatures of two or more battery units of a plurality of battery units which are connected in series to each other; and a battery control unit that controls charge and discharge of the battery units on the basis of the temperatures measured by the temperature measurement unit, wherein the battery control unit specifies a lowest temperature unit in which the temperature is lowest and a highest temperature unit in which the temperature is highest, on the basis of the temperatures measured by the temperature measurement unit, when the charge of the battery units is performed or the discharge of the battery units is performed, continues the charge or the discharge as it is when a first condition in which a temperature difference between the highest temperature unit and the lowest temperature unit is equal to or greater than a reference value is not satisfied, and outputs a first signal when the temperature difference satisfies the first condition.

According to the present invention, there is provided a battery pack including: a plurality of battery units which are connected in series to each other; a temperature measurement unit that measures temperatures of two or more battery units; and a battery control unit that controls charge and discharge of the battery units on the basis of the temperatures measured by the temperature measurement unit, wherein the battery control unit specifies a lowest temperature unit in which the temperature is lowest and a highest temperature unit in which the temperature is highest, on the basis of the temperatures measured by the temperature measurement unit, when the charge of the battery units is performed or the discharge of the battery units is performed, continues the charge or the discharge as it is when a first condition in which a temperature difference between the highest temperature unit and the lowest temperature unit is equal to or greater than a reference value is not satisfied, and outputs a first signal when the temperature difference satisfies the first condition.

According to the present invention, there is provided an electronic device including: a battery pack including a plurality of battery units which are connected in series to each other; a temperature measurement unit that measures temperatures of two or more battery units; a battery control unit that controls discharge of the battery units on the basis of the temperatures measured by the temperature measurement unit; a load that consumes power of the discharge from the battery pack; and a load control unit, connected to the battery control unit, which controls the load, wherein the battery control unit specifies a lowest temperature unit in which the temperature is lowest and a highest temperature unit in which the temperature is highest, on the basis of the temperatures measured by the temperature measurement unit, when the charge of the battery units is performed, continues the charge or the discharge as it is when a first condition in which a temperature difference between the highest temperature unit and the lowest temperature unit is equal to or greater than a reference value is not satisfied, and outputs a first signal when the temperature difference satisfies the first condition, and the load control unit reduces a current in the discharge when the first signal is received from the battery control unit.

According to the present invention, there is provided a charger including: a temperature measurement unit that measures temperatures of two or more battery units of a plurality of battery units which are connected in series to each other; a battery control unit that controls charge of the battery units on the basis of the temperatures measured by the temperature measurement unit; and a charge control unit, connected to the battery control unit, which controls a voltage and a current in the charge, wherein the battery control unit specifies a lowest temperature unit in which the temperature is lowest and a highest temperature unit in which the temperature is highest, on the basis of the temperature measured by the temperature measurement unit, when the charge of the battery unit is performed, continues the charge or the discharge as it is when a first condition in which a temperature difference between the highest temperature unit and the lowest temperature unit is equal to or greater than a reference value is not satisfied, and outputs a first signal when the temperature difference satisfies the first condition, and the charge control unit reduces the current in the charge when the first signal is received from the battery control unit.

According to the present invention, the battery control unit outputs the first signal when the first condition in which the temperature difference between the highest temperature unit and the lowest temperature unit is equal to or greater than a reference value is satisfied. When the first signal is received, the electronic device or the charger can reduce a current in discharge or charge. Thereby, it is possible to suppress the over-discharge or over-charge of any of the battery units due to the voltage difference caused by the temperature difference between each of the battery units. Therefore, it is possible to stably discharge or charge the battery pack.

BRIEF DESCRIPTION OF THE DRAWINGS

The above-mentioned objects, other objects, features and advantages will be made clearer from the preferred embodiments described below, and the following accompanying drawings.

FIG. 4 is a diagram illustrating a control method according to the first embodiment.

FIG. 5 is a diagram illustrating a control method according to the first embodiment.

DESCRIPTION OF EMBODIMENTS

Figure 1:
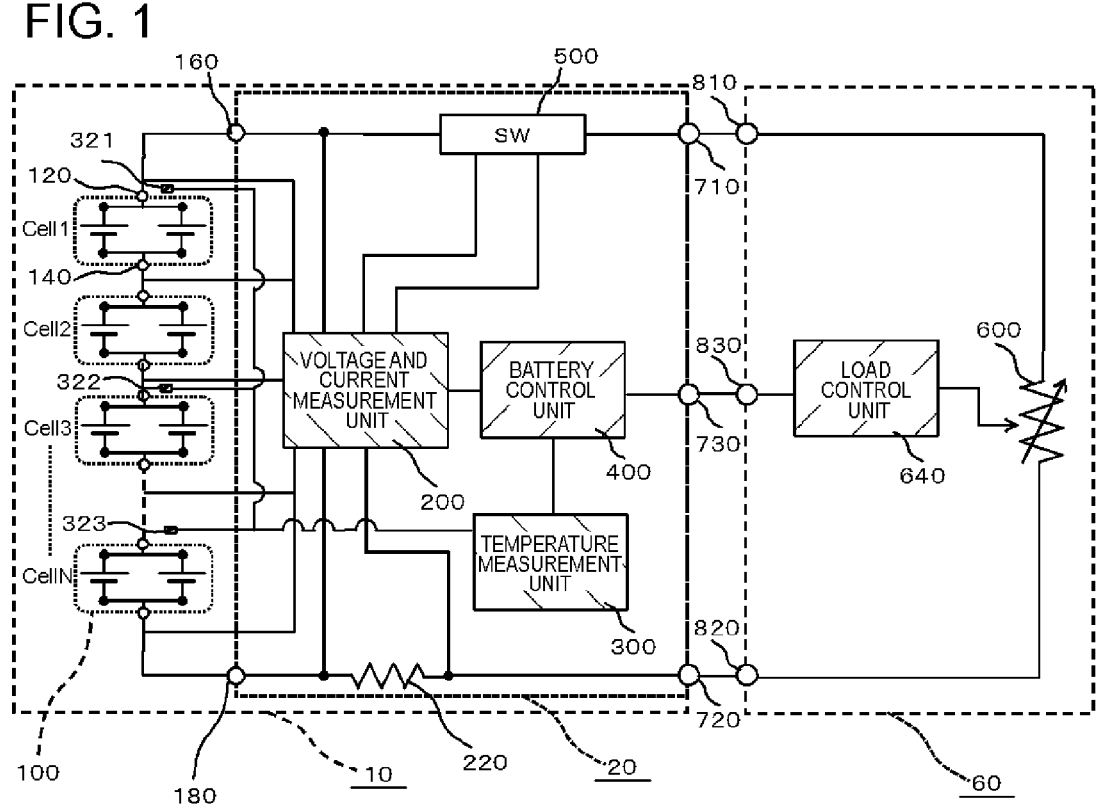
FIG. 1 is a circuit diagram illustrating a configuration of a battery pack and an electronic device according to a first embodiment.

Hereinafter, embodiments of the present invention will be described with reference to the accompanying drawings. In all the drawings, like elements are referenced by like reference numerals and descriptions thereof will not be repeated.

The term "battery pack 10" as used herein refers to an assembled battery having a plurality of battery units. In addition, the term "battery unit" refers to a unit having at least one or more battery cells 100. Further, the battery cell 100 included in the "battery unit" may include a plurality of single batteries having a positive electrode, a negative electrode and the like. In addition, a plurality of "battery units" may include a different quantity of the battery cells 100, respectively. In the following, a description will be given of a case where the "battery unit" included in the "battery pack 10" is the battery cell 100 having two single batteries which are connected in parallel to each other.

First Embodiment

The battery pack 10 according to the first embodiment will be described with reference to FIG. 1. FIG. 1 is a circuit diagram illustrating a configuration of the battery pack 10 and an electronic device 60 according to the first embodiment. The battery pack 10 includes a plurality of battery cells 100, a temperature measurement unit (temperature measurement unit 300 and temperature sensor), and a battery control unit (battery control unit 400). The plurality of battery cells 100 are connected in series to each other. The temperature measurement unit 300 measures the temperatures of two or more battery cells 100. The battery control unit 400 controls charge and discharge of the battery cell 100 on the basis of the temperature measured by the temperature measurement unit 300. In addition, when the charge is performed on the battery cells 100 or the discharge of the battery cells 100 is performed, the battery control unit 400 specifies a lowest temperature cell having the lowest temperature and a highest temperature cell having the highest temperature on the basis of the temperature measured by the temperature measurement unit 300. In addition, the battery control unit 400 obtains a temperature difference $\Delta T$ between the highest temperature cell and the lowest temperature cell through an arithmetic operation process, and continues the charge or discharge as it is when a first condition in which the temperature difference $\Delta T$ is equal to or greater than a reference value $T_1$ is not satisfied. On the other hand, when the temperature difference $\Delta T$ satisfies the first condition, the battery control unit 400 outputs a first signal. Hereinafter, a detailed description will be given.

As shown in FIG. 1, the battery pack 10 includes a plurality of battery cells 100. Here, the battery pack 10 includes, for example, N battery cells 100. In addition, as described above, the battery cell 100 has two single batteries. Specifically, the battery cell 100 is a Li-ion secondary battery. In addition, the battery cell 100 is, for example, a laminate-type battery in which a laminate film is used in an exterior material. In the battery pack 10 according to the first embodiment, the plurality of battery cells 100 are received in exterior bodies (not shown), respectively, and are packaged in the battery pack 10 in a state where the battery cells are placed in a row. Meanwhile, the package aspect of the battery cell 100 may be formed in an arbitrary manner, and may be formed, for example, in a state where the plurality of battery cells 100 are laminated in a row in the thickness direction thereof, or in a state where the laminated battery cells 100 are disposed adjacent to each other in a plurality of rows. In such a package or the like, it is also possible to obtain the same effect as that in the first embodiment.

The full charge capacities of the respective battery cells 100 in the first embodiment are, for example, equal to each other. Such a battery pack 10 is particularly effective when a variation occurs in the voltage of the battery cells 100 due to the temperature of each of the battery cells 100. Meanwhile, in principle, even when the full charge capacities of the respective battery cells 100 are different from each other, the same effect can be obtained.

The battery pack 10 in the first embodiment includes a control circuit 20 in addition to the battery cells 100. The control circuit 20 includes a voltage and current measurement unit 200, a temperature measurement unit 300, a battery control unit 400 and a switch 500.

In addition, the control circuit 20 is connected to the battery cells 100 which are connected in series to each other. The control circuit 20 includes an internal positive electrode terminal 160, an internal negative electrode terminal 180, an external positive electrode terminal 710 and an external negative electrode terminal 720. The internal positive electrode terminal 160 is connected to a positive electrode terminal 120 of one battery cell 100 connected in series. In addition, the internal negative electrode terminal 180 is connected to a negative electrode terminal 140 of another battery cell 100 connected in series.

The internal positive electrode terminal 160 is connected to the external positive electrode terminal 710 for connection to an external device using the battery pack 10 through an interconnect (no sign shown) and the switch 500 within the control circuit 20. In addition, the internal negative electrode terminal 180 is also connected to the external negative electrode terminal 720 similarly.

The switch 500 for stopping charge or discharge is provided between the internal positive electrode terminal 160 and the external positive electrode terminal 710. The switch 500 is provided between, for example, the internal positive electrode terminal 160 on the battery cell 100 side and the external positive electrode terminal 710. In this case, the switch 500 is, for example, a P-channel metal oxide semiconductor field effect transistor (MOSFET). Two P-channel MOSFETs are provided within the switch 500. Thereby, one MOSFET is used for controlling charge. On the other hand, the other MOSFET is used for controlling discharge. In addition, each MOSFET in the switch 500 is connected to the voltage and current measurement unit 200.

Meanwhile, when the switch 500 is an N-channel MOSFET, the switch 500 is disposed between the internal negative electrode terminal 180 and the external negative electrode terminal 720. Besides, the switch 500 may be, for example, an insulated gate bipolar transistor (IGBT), a relay or a breaker.

The control circuit 20 is provided with the temperature measurement unit 300. The temperature measurement unit 300 measures the temperatures of two or more battery cells 100. The temperature measurement unit 300 includes at least two or more temperature sensors (321, 322, and 323). The temperature sensor is, for example, a thermocouple.

The temperature sensor of the temperature measurement unit 300 is provided, for example, so as to measure the temperatures of at least one battery cell 100 which is disposed at the outermost side and a battery cell 100 which is located further inside than the at least one battery cell 100. When the battery pack 10 is electrified, the battery cell 100 which is disposed at the outermost side in the battery cells 100 within the battery pack 10 has a tendency of dissipating heat to the outside, and thus is not likely to warm up. On the other hand, in this case, the battery cell 100 disposed inside the battery pack 10 has a tendency to warm up due to the generation of heat caused by the internal resistance of the battery cell 100. Therefore, for example, the temperature sensor is disposed as described above, and thus it is possible to measure the temperatures of two battery cells 100 having a largest temperature difference.

Here, for example, the temperature sensor 321, the temperature sensor 322 and the temperature sensor 323 are respectively provided so as to come into contact with different battery cells 100. Among them, the temperature sensor 321 is provided so as to come into contact with a battery cell 100 (Cell 1 in the drawing) which is disposed at the outermost side. In addition, the temperature sensor 322 is provided so as to come into contact with a battery cell 100 (Cell 3 in the drawing) located near the center of the battery pack 10. In addition, the temperature sensor 323 is provided so as to come into contact with a battery cell 100 (Cell N in the drawing) which is disposed at the outside on the opposite side to the temperature sensor 321. Meanwhile, each of the temperature sensors is attached to, for example, an exterior body (not shown) that receives the battery cells 100.

In addition, the temperature sensor may be further provided near the outside of the battery pack 10. Thereby, the temperature measurement unit 300 can measure the temperature of outside air.

In addition, the temperature measurement unit 300 receives a signal such as a thermo-electromotive force occurring in the above-mentioned temperature sensor to calculate a temperature. The temperature measurement unit 300 is connected to the battery control unit 400. Thereby, the battery control unit 400 receives a signal of the temperature measured by the temperature measurement unit 300. Meanwhile, the battery control unit 400 may receive a signal of the temperature sensor to calculate a temperature.

In addition, as shown in FIG. 1, the control circuit 20 may be provided with the voltage and current measurement unit 200. The voltage and current measurement unit 200 measures the voltage and current of each of the plurality of battery cells 100. The voltage and current measurement unit 200 is connected between the battery cells 100 through an interconnect (no sign shown). In addition, the voltage and current measurement unit 200 may measure a voltage between both ends of the internal positive electrode terminal 160 and the internal negative electrode terminal 180 in order to measure the sum of the voltages of the plurality of battery cells 100 which are connected in series to each other.

In addition, a resistor 220 of which the resistance value is known is provided between the internal negative electrode terminal 180 and the external negative electrode terminal 720. The voltage and current measurement unit 200 is connected to both ends of the resistor 220. In this manner, by measuring a voltage value applied to the resistor 220, the voltage and current measurement unit 200 calculates a value divided by the above resistance value as a value of a current flowing through the battery cell 100.

The battery control unit 400 is connected to the temperature measurement unit 300 and the voltage and current measurement unit 200. The battery control unit 400 controls the charge and discharge of each of the battery cells 100 on the basis of the temperature measured by the temperature measurement unit 300 and the voltage and current measured by the voltage and current the measurement unit 200. The battery control unit 400 includes an arithmetic operation unit (not shown) that performs an arithmetic operation process on the basis of the temperature and the voltage and current mentioned above. For example, the battery control unit 400 specifies the lowest temperature cell having the lowest temperature and the highest temperature cell having the highest temperature from the battery cells 100 provided with the temperature sensor, on the basis of the temperature measured by the temperature measurement unit 300. Besides, the battery control unit 400 may include a storage unit (not shown) that stores the measured temperature, voltage and current, or various types of settings values. The storage unit as used herein, in other words, refers to a memory region.

The "highest temperature cell" and "lowest temperature cell" as used herein refer to, for example, the battery cell 100 having the highest temperature and the battery cell 100 having the lowest temperature out of the battery cells 100, provided with the temperature sensor, which are measured by the temperature measurement unit 300. Therefore, the "highest temperature cell" and the "lowest temperature cell" are not necessarily the battery cell 100 having the highest temperature and the battery cell 100 having the lowest temperature in the battery pack 10. On the other hand, the "highest temperature cell" and the "lowest temperature cell" may be specified as, for example, the battery cell 100 having the highest temperature and the battery cell 100 having the lowest temperature from N battery cells 100 of the battery pack 10, on the basis of an estimated temperature map obtained by measuring a temperature distribution in advance. In other words, the "highest temperature cell" and the "lowest temperature cell" may be specified on the basis of the temperature distribution of the battery cells 100 provided with the temperature sensor, from the N battery cells 100 inclusive of the other battery cells 100 which are not provided with the temperature sensor. Meanwhile, the estimated temperature map is stored in the storage unit of the battery control unit 400.

In addition, the battery control unit 400 includes a communication unit (not shown) for transmitting a signal from the battery control unit 400 to the electronic device 60 or receiving a signal from the electronic device 60. The battery control unit 400 is connected to a communication terminal 730 for transmitting and receiving a signal to and from the electronic device 60.

Here, the battery control unit 400 obtains the temperature difference $\Delta T$ between the highest temperature cell and the lowest temperature cell through an arithmetic operation process, and continues the charge or discharge, as it is, when the first condition in which the temperature difference $\Delta T$ is equal to or greater than the reference value $T_1$ is not satisfied. On the other hand, when the temperature difference $\Delta T$ satisfies the first condition, the battery control unit 400 outputs a first signal. The battery control unit 400 transmits, for example, the first signal to a load control unit 640 of the electronic device 60 through the communication terminal 730. Meanwhile, the details of such a control method will be described later.

In addition, the "first signal" may include, for example, a voltage difference signal indicating the voltage difference between the highest temperature cell and the lowest temperature cell. Thereby, the load control unit 640 of the electronic device 60 having received the first signal including the voltage difference signal can control a load on the basis of the voltage difference signal.

In addition, the "first signal" may include, for example, a temperature difference signal indicating the temperature difference $\Delta T$ between the highest temperature cell and the lowest temperature cell. Thereby, the load control unit 640 of the electronic device 60 having received the first signal including the temperature difference signal can control a load on the basis of the temperature difference signal.

In addition, the "first signal" may include, for example, a temperature signal indicating the temperature of at least one battery cell 100 out of the lowest temperature cell and the highest temperature cell. Thereby, the load control unit 640 of the electronic device 60 having received the first signal including the temperature signal can control a load on the basis of the temperature signal.

Further, the "first signal" may include, for example, a signal of the temperature of outside air indicating the temperature of outside air. Thereby, the load control unit 640 of the electronic device 60 having received the first signal including the temperature signal sets the reference value $T_1$ of the temperature difference $\Delta T$ described later on the basis of the signal of the temperature of outside air, and thus can control a load.

In addition, the voltage and current measurement unit 200, the battery control unit 400 and the switch 500 function as protection circuits in order to improve safety and the cycle life of charge and discharge. When the battery cell 100 is discharged down to an over-discharge detection voltage value $V_{OD}$ or lower, the voltage and current measurement unit 200, the battery control unit 400 and the switch 500 terminate the discharge forcibly. On the other hand, when the battery cell is charged up to an over-charge detection voltage value $V_{OC}$ or higher, the charge is terminated forcibly. Besides, the storage unit of the battery control unit 400 stores the reference value $T_1$ of the temperature difference $\Delta T$, and the like.

In this manner, in the first embodiment, the battery pack 10 including the plurality of battery cells 100 and control circuit 20 is packaged.

Next, the electronic device 60 connected to the battery pack 10 according to the first embodiment will be described. The electronic device 60 includes a load 600 and a load control unit (load control unit 640). The load 600 of the electronic device 60 consumes power due to discharge from the battery pack 10. The load control unit 640 is connected to the battery control unit 400, and receives a first signal and controls the load 600. In addition, when the first signal is received from the battery control unit 400, the load control unit 640 reduces a current in the discharge. Hereinafter, a detailed description will be given.

FIG. 1 schematically shows the electronic device 60. The load 600, provided therein, consumes power due to the discharge from the battery pack 10. In FIG. 1, the load 600 is shown collectively as a variable resistor that consumes power.

Here, the electronic device 60 is, for example, a display device. Specifically, the electronic device 60 is a liquid crystal display device. Therefore, the electronic device 60 includes a display unit, a light-emitting unit, a tuner unit, an operating unit and the like (all not shown) as the load 600. The load 600 includes at least one or more light-emitting units (not shown). The light-emitting unit is, for example, a backlight of a liquid crystal display device.

The load 600 is connected to a positive electrode terminal 810 and a negative electrode terminal 820 through an interconnect (not shown). The positive electrode terminal 810 and the negative electrode terminal 820 of the electronic device 60 are connected to the external positive electrode terminal 710 and the external negative electrode terminal 720 of the battery pack 10 through, for example, an interconnect (no sign shown). Thereby, the electronic device 60 can receive power due to the discharge of the battery pack 10.

The load control unit 640 is connected to the load 600. The load control unit 640 controls the load 600. Thereby, the load control unit 640 controls the amount of power consumption due to the load 600. Specifically, for example, when the load 600 includes a backlight, the load control unit 640 controls the luminance of the backlight.

In addition, the load control unit 640 is connected to a communication terminal 830. The communication terminal 830 on the electronic device 60 side is connected to the communication terminal 730 on the battery pack 10 side through, for example, an interconnect (not shown). Thereby, the load control unit 640 is connected to the battery control unit 400, and can receive the first signal.

Besides, the load control unit 640 may include an arithmetic operation unit (not shown). The arithmetic operation unit performs an arithmetic operation process in accordance with the first signal or the like from the battery control unit 400, and can perform most appropriate control on the load 600 at that point in time.

When the first signal is received from the battery control unit 400, the load control unit 640 reduces a current. The load control unit 640, for example, reduces a current monotonically. In this case, for example, when the load 600 includes a backlight, the load control unit 640 reduces the current by lowering the luminance of the light-emitting unit. Thereby, it is possible to suppress the occurrence of a variation in the voltage of each of the battery cells 100 due to temperature.

Figure 2:
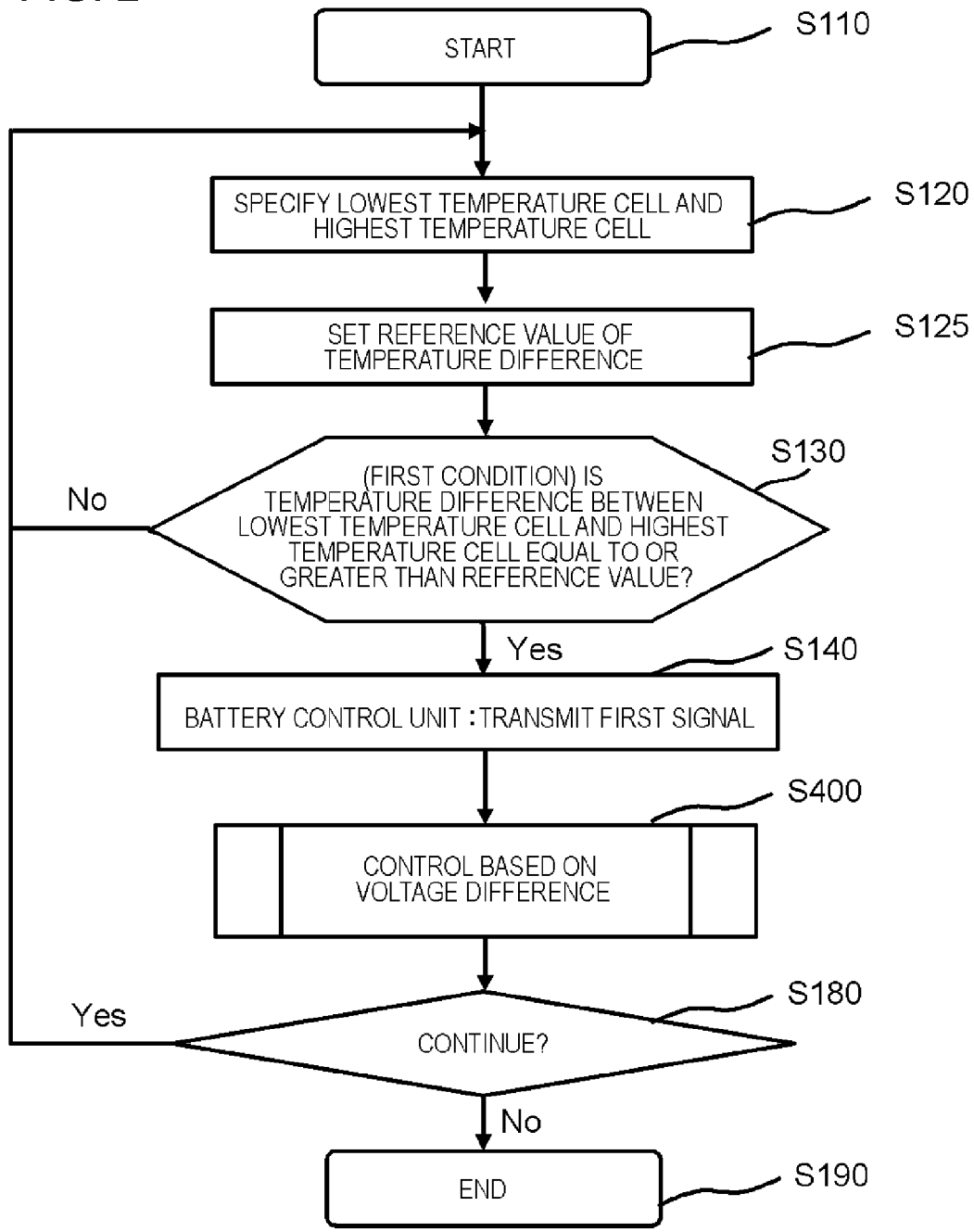
FIG. 2 is a flow diagram illustrating a control method according to the first embodiment.
Figure 3:
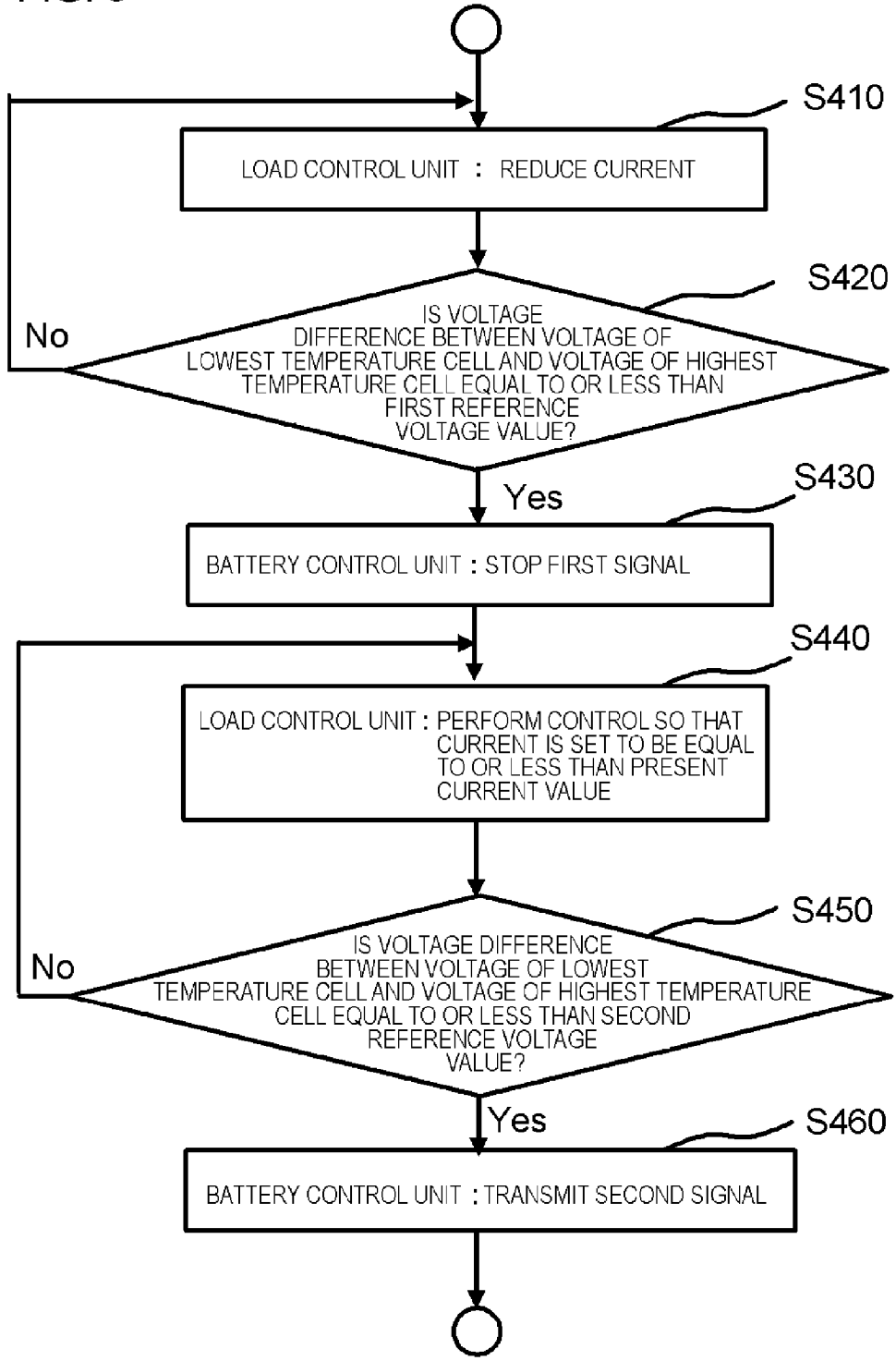
FIG. 3 is a flow diagram illustrating a control method according to the first embodiment.

Next, the control method of the battery pack 10 stated above will be described with reference to FIGS. 2 to 5. FIGS. 2 and 3 are flow diagrams illustrating a control method according to the first embodiment. FIGS. 4 and 5 are diagrams illustrating a control method according to the first embodiment. The control method according to the first embodiment includes the following steps. First, when the discharge of the battery cells 100 is performed, the battery control unit 400 specifies the lowest temperature cell having the lowest temperature and the highest temperature cell having the highest temperature on the basis of the temperature measured by the temperature measurement unit 300 (S120). Next, the battery control unit 400 determines the first condition in which the temperature difference ΔT between the highest temperature cell and the lowest temperature cell is equal to or greater than the reference value $T_1$ (S130). Next, the battery control unit 400 continues the discharge, as it is, when the first condition in which the temperature difference ΔT between the highest temperature cell and the lowest temperature cell is equal to or greater than the reference value $T_1$ is not satisfied (S130; No). On the other hand, when the temperature difference ΔT satisfies the first condition (S130; Yes), the battery control unit 400 outputs the first signal (S140). Hereinafter, a detailed description will be given.

Here, each of the battery cells 100 becomes in a state of being charged up to full charge. That is, the voltage in the discharge of each of the battery cells 100 in an initial step is, for example, $V_C$. In addition, the residual capacity of each of the battery cells 100 is a full charge capacity.

First, in the flow diagram of FIG. 2, the discharge from the plurality of battery cells 100 is started. Specifically, the positive electrode terminal 810 and the negative electrode terminal 820 of the electronic device 60 are respectively connected to the external positive electrode terminal 710 and the external negative electrode terminal 720 of the battery pack 10. At the same time, the temperature measurement unit 300 starts to measure the temperature of the battery cell 100 provided with the temperature sensor. In addition, the voltage and current measurement unit 200 starts to measure the voltages and currents of the plurality of battery cells 100 which are connected in series to each other (S110).

Here, power due to the discharge of the battery pack 10 is consumed by the load 600 of the electronic device 60. In addition, the load 600 is controlled by the load control unit 640, and thus operates supposedly at a constant current. Meanwhile, here, it is considered that the switch 500 is provided with an internal resistance which is negligibly small.

In addition, when the battery cell 100 is electrified, Joule heat is emitted due to the internal resistance of the battery cell 100 or the like. In principle, the temperature of each of the battery cells 100 rises due to the Joule heat. However, it is not always true that the temperature of each of the battery cells 100 rises equally due to the factors of the position of the battery cell 100, the usage environment of the electronic device 60 such as the temperature of outside air, the specific heat of the battery cell 100 itself, the package aspect of the battery pack 10, the dissipation of heat to the outside, the discharge current of the electronic device 60, and the like.

Next, the battery control unit 400 specifies the lowest temperature cell having the lowest temperature and the highest temperature cell having the highest temperature on the basis of the temperature measured by the temperature measurement unit 300 (S120). Here, for example, in the initial step of the discharge, the battery cell 100 (Cell 1 in FIG. 1) which is disposed at the outermost side has a tendency of allowing heat to escape, and thus becomes the lowest temperature cell. On the other hand, the battery cell 100 (Cell 3 in FIG. 1) located near the center of the battery pack 10 is not likely to cause heat to escape, and thus becomes the highest temperature cell.

FIG. 4(*a*) shows a relationship between the time from the discharge start time and the temperature difference ΔT between the highest temperature cell and the lowest temperature cell in the first embodiment.

As shown in FIG. 4(*a*), the temperature difference ΔT between the highest temperature cell and the lowest temperature cell increases monotonically in the initial step of the discharge at earlier than time $t_1$. Meanwhile, in the initial step, when the temperature difference is small, and it is difficult to specify the highest temperature cell and the lowest temperature cell, the highest temperature cell and the lowest temperature cell may be updated at any time.

In addition, FIG. 4(*b*) shows a relationship between the time from the discharge start time, and the voltage $V_a$ of the lowest temperature cell and the voltage $V_b$ of the highest temperature cell in the first embodiment. In addition, the drawing shows a relationship between the time from the discharge start time, and the voltage difference ΔV between the voltage $V_b$ of the highest temperature cell and the voltage $V_a$ of the lowest temperature cell in the first embodiment. Meanwhile, the lowest temperature cell is shown by thick solid lines, and the highest temperature cell is shown by thin solid lines. In addition, FIG. 4(*c*) shows a relationship between the time from the discharge start time and the current of the battery cell 100 in the first embodiment.

In FIG. 4(*c*), the load 600 operates at a constant current due to the load control unit 640. For this reason, discharge until time $t_1$ is constant current discharge. In addition, all the battery cells 100 inclusive of the lowest temperature cell and the highest temperature cell are connected in series to each other. Therefore, the current of all the battery cells 100 is kept constant at a constant current value $I_{D1}$. Meanwhile, here, in order to simplify the description, a constant current is just assumed to be used, but it is possible to obtain an effect of the first embodiment even when a current changes.

Here, FIG. 5(*a*) shows a relationship between the temperature in the battery cell 100 and the internal resistance of the battery cell 100. As the temperature in the battery cell 100 becomes lower, the internal resistance of the battery cell 100 becomes larger. Particularly, as the temperature becomes lower, the internal resistance has a tendency to increase significantly. For this reason, the internal resistance of the lowest temperature cell is larger than the internal resistance of the highest temperature cell. Therefore, even when the same current flows, the magnitudes of voltage drops are different from each other due to a difference between the internal resistances. For this reason, the voltage in each of the battery cells 100 varies.

As shown in FIG. 4(*b*), at earlier than time $t_1$, the voltage $V_a$ of the lowest temperature cell drops faster than the voltage $V_b$ of the highest temperature cell due to a difference between the internal resistances. This difference ($V_b$-$V_a$) is equal to a value obtained by multiplying the difference between the internal resistances by $I_{D1}$.

Next, the battery control unit 400 sets the "reference value $T_1$ of the temperature difference $\Delta T$" (S125). The "reference value $T_1$ of the temperature difference $\Delta T$" as used herein refers to, as described later, a threshold of the temperature difference $\Delta T$ in order for the battery control unit 400 to output the first signal. In other words, the "reference value $T_1$ of the temperature difference $\Delta T$" is a threshold to start control for suppressing the variation of the voltage of the battery cells 100 due to temperature. Meanwhile, the "reference value $T_1$ of the temperature difference $\Delta T$" may be set in advance. In that case, this step can be omitted.

Here, as shown in FIG. 5(*a*), the internal resistance of the battery cell 100 has a tendency to increase drastically as the temperature becomes lower. For this reason, the voltage drop of the lowest temperature cell becomes faster than the voltage drops of other battery cells 100. Therefore, as the temperature of the battery cell 100 becomes lower, a difference in voltage between each of the battery cells 100 has a tendency to increase drastically due to a slight temperature difference between the battery cells 100.

Consequently, the battery control unit 400 changes the "reference value $T_1$ of the temperature difference $\Delta T$" in the first condition on the basis of the temperature of the battery cell 100. The "reference value $T_1$ of the temperature difference $\Delta T$" is set to a dramatically smaller value, for example, as the temperature of the lowest temperature cell or the highest temperature cell becomes lower.

That is, for example, the battery control unit 400 may change the "reference value $T_1$ of the temperature difference $\Delta T$" for the temperature T of the battery cell 100 as shown in FIG. 5(*b*). Meanwhile, FIG. 5(*b*) shows a relationship between the temperature in the battery cell 100 and the "reference value $T_1$ of the temperature difference $\Delta T$". When the temperature of the battery cell 100 is low, the "reference value $T_1$ of the temperature difference $\Delta T$" is set to be lower, and thus the battery control unit 400 can perform control for reducing the voltage difference between each of the battery cells 100 in accordance with a variation in voltage between each of the battery cells 100 even with a slight temperature difference between the battery cells 100. Here, for example, the "reference value $T_1$ of the temperature difference $\Delta T$" is set from FIG. 5(*b*) on the basis of the temperature of the lowest temperature cell. Meanwhile, the reference value $T_1$ of the temperature difference $\Delta T$ may be set in advance, and be stored in the storage unit.

Meanwhile, the "reference value $T_1$ of the temperature difference $\Delta T$" for the temperature of the battery cell 100 is stored in the storage unit of the battery control unit 400 as a table form or a function.

In addition, the battery control unit 400 may change the table or the function in accordance with the environment in which the electronic device 60 is used, or the like.

Next, the battery control unit 400 determines the first condition in which the temperature difference $\Delta T$ between the highest temperature cell and the lowest temperature cell is equal to or greater than the reference value $T_1$ (S130).

When the first condition in which the temperature difference $\Delta T$ between the highest temperature cell and the lowest temperature cell is equal to or greater than the reference value $T_1$ is not satisfied (S130; No), the battery control unit 400 continues the discharge as it is.

On the other hand, when the temperature difference $\Delta T$ satisfies the first condition (S130; Yes), the battery control unit 400 outputs the first signal (S140). This first signal is transmitted to the load control unit 640 of the electronic device 60 through the communication terminal 730 of the battery pack 10 and the communication terminal 830 of the electronic device 60.

The "first signal" as used herein refers to a signal which is output in order for the battery control unit 400 to reduce a current on the load 600 side. The "first signal" can be changed depending on the connected electronic device 60. Specifically, the "first signal" may be, for example, a 1-bit signal for switching the turn-on or turn-off of the load 600. In addition, the "first signal" may be, for example, a pulse signal. In this case, the modulation scheme of the "first signal" may be, for example, a pulse width modulation (PWM) scheme or a pulse amplitude modulation (PAM) scheme.

In addition, the "first signal" may include, for example, a voltage difference signal indicating the voltage difference $\Delta V$ between the highest temperature cell and the lowest temperature cell. Thereby, when the first signal including the voltage difference signal is received, the load control unit 640 reduces a current on the basis of the voltage difference signal. The current is reduced by the load control unit 640, and thus in all the battery cells 100, it is possible to reduce the voltage drop due to the internal resistance. Therefore, it is possible to reduce the voltage difference between each of the battery cells 100 during electrification.

In addition, the "first signal" may include, for example, a temperature difference signal indicating the temperature difference $\Delta T$ between the highest temperature cell and the lowest temperature cell. When the first signal including the temperature difference signal is received, the load control unit 640 performs control so that the current decreases greatly as the temperature difference becomes larger. As described above, as the temperature difference $\Delta T$ becomes larger, a difference in internal resistance between each of the battery cells 100 increases. For this reason, the current is reduced by the load control unit 640, and thus in all the battery cells 100, it is possible to reduce the voltage drop due to the internal resistance. Therefore, it is possible to reduce the voltage difference between each of the battery cells 100 during electrification.

In addition, the "first signal" may include, for example, a temperature signal indicating the temperature of at least one battery cell 100 out of the lowest temperature cell and the highest temperature cell. When the first signal including the temperature signal is received, the load control unit 640 performs control so that the current decreases as the temperature becomes lower. As described above, as the temperature of the battery cell 100 becomes lower, a difference in internal resistance between each of the battery cells 100 has a tendency to increase. Therefore, the current is reduced by the load control unit 640, and thus in all the battery cells 100, it is possible to reduce the voltage drop due to the internal resistance even when a difference in internal resistance between each of the battery cells 100 is large. Therefore, it is possible to reduce the voltage difference between each of the battery cells 100 during electrification.

Further, the "first signal" may include, for example, a signal of the temperature of outside air indicating the temperature of outside air. When the first signal including the signal of the temperature of outside air is received, the load control unit 640 performs control so that the current is reduced as the temperature of outside air becomes lower. When the temperature of outside air is low, there is the possibility of, for example, the temperature of the lowest temperature cell which is disposed at the outermost side becoming lower. Therefore, the current is reduced by the load control unit 640, and thus it is possible to suppress the occurrence of a variation in the voltages of the battery cells 100 during electrification due to the influence of the temperature of outside air.

In addition, the "first signal" may be, for example, a signal corresponding to the voltage value of the present lowest temperature cell or the like. In addition, the "first signal" may include a signal corresponding to the current value of the present battery pack 10.

Here, in FIGS. 4(a), 4(b) and 4(c), the time when the first condition is satisfied (S130; Yes) is time $t_1$. As shown in FIG. 4(a), the temperature difference ΔT between the highest temperature cell and the lowest temperature cell is the reference value $T_1$. Therefore, the temperature difference ΔT is in a state where the first condition is satisfied.

In addition, as shown in FIG. 4(b), at time $t_1$, the voltage difference between the highest temperature cell and the lowest temperature cell increases until $V_{g0}$.

Here, the battery control unit 400 and the load control unit 640 perform control based on the voltage difference ΔV between the highest temperature cell and the lowest temperature cell as follows (S400).

FIG. 3 is a flow diagram illustrating the details of control based on the voltage difference ΔV. When the first signal is received from the battery control unit 400 at time $t_1$, the load control unit 640 reduces a current (S410). Thereby, the load control unit 640 can reduce the voltage difference between each of the battery cells 100 during electrification. Meanwhile, in this case, the load control unit 640 performs control such that the current has a value capable of driving at least the load 600.

In the first embodiment, the load 600 includes a light-emitting unit (light-emitting unit such as a backlight). In this case, the load control unit 640 reduces the current by lowering the luminance of the light-emitting unit.

As shown in FIG. 4(c), after time $t_1$, the load control unit 640 reduces the current, for example, linearly from the constant current value $I_D$. Specifically, the load control unit 640 reduces the current flowing through the light-emitting unit, and drops the luminance.

In addition, as shown in FIG. 4(a), after time $t_1$, for the following two reasons, an increase in temperature difference ΔT becomes gentle, and next, the temperature difference ΔT decreases. The first reason is because the heat generation of the entire battery pack 10 is suppressed by reducing the current when the first signal is received by the load control unit 640. The second reason is because the Joule heat of the lowest temperature cell becomes larger than the Joule heat of the highest temperature cell due to the arrangement of the battery cells 100. In the first embodiment, for example, the highest temperature cell is a battery cell 100 which is disposed inside the battery pack 10, whereas the lowest temperature cell is a battery cell 100 which is disposed outside the battery pack 10. For this reason, when the battery pack 10 is electrified, the internal resistance of the lowest temperature cell is higher than the internal resistance of the highest temperature cell. That is, the amount of heat generation due to the internal resistance of the lowest temperature cell becomes larger than that of the highest temperature cell. Therefore, a temperature rise of the lowest temperature cell becomes faster than that of the highest temperature cell. In this manner, after time $t_1$, an increase in temperature difference ΔT becomes gentle, and next, the temperature difference ΔT decreases.

In addition, as shown in FIG. 4(b), until time $t_1$, the voltage $V_a$ of the lowest temperature cell drops much lower than the voltage $V_b$ of the highest temperature cell. After time $t_1$, the current is reduced by the load control unit 640, and thus a voltage drop component due to the internal resistance is reduced. In the first embodiment, after time $t_1$, for example, the voltage of each of the battery cells 100 increases by the decrement of the above voltage drop component due to the internal resistance. Further, the voltage $V_a$ of the lowest temperature cell comes close to the voltage $V_b$ of the highest temperature cell.

Next, the battery control unit 400 determines whether the voltage difference ΔV between the highest temperature cell and the lowest temperature cell is equal to or less than a first reference voltage value $V_{g1}$ (S420). The first reference voltage value $V_{g1}$ can be set to a voltage value smaller than the potential difference $V_{g0}$ between the highest temperature cell and the lowest temperature cell immediately after the first signal is output. In the first embodiment, $V_{g1}$ is set to a value of ⅔ of $V_{g0}$.

After time $t_1$, when the voltage difference ΔV between the highest temperature cell and the lowest temperature cell is higher than the first reference voltage value $V_{g1}$ (S420; No), the load control unit 640 continues control for reducing the current (S410).

As shown in FIG. 4(a), an increase in temperature difference ΔT becomes gentle after time $t_1$, and the temperature difference ΔT becomes a maximum value $T_M$ at time $t_2$. Further, after time $t_2$, the temperature difference ΔT drops gently in association with a reduction in current in the discharge.

As shown in FIG. 4(b), further, the load control unit 640 performs control for reducing the current, and thus at time $t_2$, the voltage difference ΔV between the highest temperature cell and the lowest temperature cell becomes equal to or less than the first reference voltage value $V_{g1}$.

As in the case of time $t_2$, when the voltage difference ΔV between the highest temperature cell and the lowest temperature cell is equal to or less than the first reference voltage value $V_{g1}$ (S420; Yes), the battery control unit 400 stops the first signal (S430).

Accordingly, the load control unit 640 stops control for reducing the current drastically. Meanwhile, a period in which the "first signal" is output is preferably determined, as described above, on the basis of the potential difference between the highest temperature cell and the lowest temperature cell, but may change depending on the situation. The period in which the "first signal" is output is, for example, a period continuing while the above first condition is satisfied. In addition, the period falls within, for example, the above first condition and thus may be set to a constant time. Further, the period may be determined on the basis of the time rate of change of the temperature difference ΔT. That is, the battery control unit may obtain the time rate of change of the temperature difference ΔT through an arithmetic operation process, and may output the "first signal" in a period (for example, period until the time rate of change becomes ½ or 0) until the time rate of change becomes smaller than the time rate of change immediately after the "first signal" is output.

Further, when the first signal is stopped, the load control unit 640 performs control so that the current is set to be, for example, equal to or less than the present current value ($I_{D2}$) (S440). Here, when the first signal is stopped, the load control unit 640 performs control so that the current is kept constant, for example, at the present current value ($I_{D2}$). Thereby, the load control unit 640 can stand by without increasing the voltage difference ΔV until the temperature difference ΔT is reduced or the temperature difference ΔT becomes in an equilibrium state.

As shown in FIG. 4(c), after time $t_2$, for example, the load control unit 640 performs control so that the current is kept constant at the constant current value $I_{D2}$.

As shown in FIG. 4(a), the temperature difference ΔT rises gently after time $t_2$, and the temperature difference ΔT becomes the maximum value $T_M$ at time $t_3$. After time $t_3$, the temperature difference $\Delta T$ is reduced gradually.

As shown in FIG. 4(b), after time $t_3$, the voltages of the lowest temperature cell and the highest temperature cell drop in association with a reduction in residual capacity. In addition, the internal resistances of the highest temperature cell and the lowest temperature cell come close to each other in association with the above-mentioned reduction in temperature difference $\Delta T$. Thereby, after time $t_2$, the voltage difference $\Delta V$ between the highest temperature cell and the lowest temperature cell is further reduced.

Next, the battery control unit 400 determines whether the voltage difference $\Delta V$ between the highest temperature cell and the lowest temperature cell is equal to or less than a second reference voltage value $V_{g2}$ lower than the first reference voltage value $V_{g1}$ (S450). The "second reference voltage value $V_{g2}$" in the first embodiment is set to be ½ of the first reference voltage value $V_{g1}$. However, when the "second reference voltage value $V_{g2}$" is lower than the first reference voltage value $V_{g1}$, it is possible to obtain the same effect even in a case of other values. For example, the "second reference voltage value $V_{g2}$" can be set to 0, a voltage equivalent to a voltage resolution in the value voltage and current measurement unit 200, or the like. When the voltage difference $\Delta V$ is larger than the second reference voltage value $V_{g2}$ (S450; No), the load control unit 640 continues control of S440.

At time $t_4$, the temperature difference $\Delta V$ is reduced to the second reference voltage value $V_{g2}$ lower than the first reference voltage value $V_{g1}$. When the temperature difference $\Delta V$ is equal to or less than the second reference voltage value $V_{g2}$ (S450; Yes), the battery control unit 400 outputs a second signal different from the first signal (S460). The "second signal" as used herein refers to a signal which is output in order for the battery control unit 400 to release current control on the load 600 side. When the second signal is received, the load control unit 640 can increase a current. In other words, when the second signal is received, the load control unit 640 can release control for setting the current to be set to be equal to or less than a constant value (S440). In this manner, the voltage difference $\Delta V$ becomes, for example, equal to or less than the second reference voltage value $V_{g2}$, the load control unit 640 determines that the temperature distribution becomes in an equilibrium state, to thereby increase a current. Meanwhile, when the load control unit 640 can recognize that above signal to be a signal different from the first signal, the modulation scheme of the second signal may be the same as mentioned above. In addition, the second signal may include the voltage difference signal or the like similarly to the first signal.

Next, it is determined whether the discharge of the battery pack 10 is continued (S180). In this case, it is determined whether the voltage of each of the battery cells 100 is equal to or higher than the over-discharge detection voltage $V_{OD}$, and the discharge may be continued when the voltage is equal to or higher than $V_{OD}$. When the discharge is continued (S180; Yes), the battery control unit 400 controls the battery pack 10 again on the basis of the temperature difference $\Delta T$ between the highest temperature cell and the lowest temperature cell. When the temperature difference $\Delta T$ increases due to a change in the usage environment of the load 600, or the like, the same control as described above is performed.

On the other hand, when the discharge of the battery pack 10 is not continued (S180; No), the use of the electronic device 60 is terminated, and the discharge of the battery pack 10 is terminated (S190).

In this manner, the battery control unit 400 and the load control unit 640 can perform control so that the voltage difference between the battery cells 100 is reduced. That is, it is possible to suppress the voltage variation of the battery cells 100. In addition, it is possible to suppress the over-discharge of the lowest temperature cell in a state where the residual capacity of all the battery cells 100 remains. As described above, the battery pack 10 according to the first embodiment is controlled.

Figure 6:
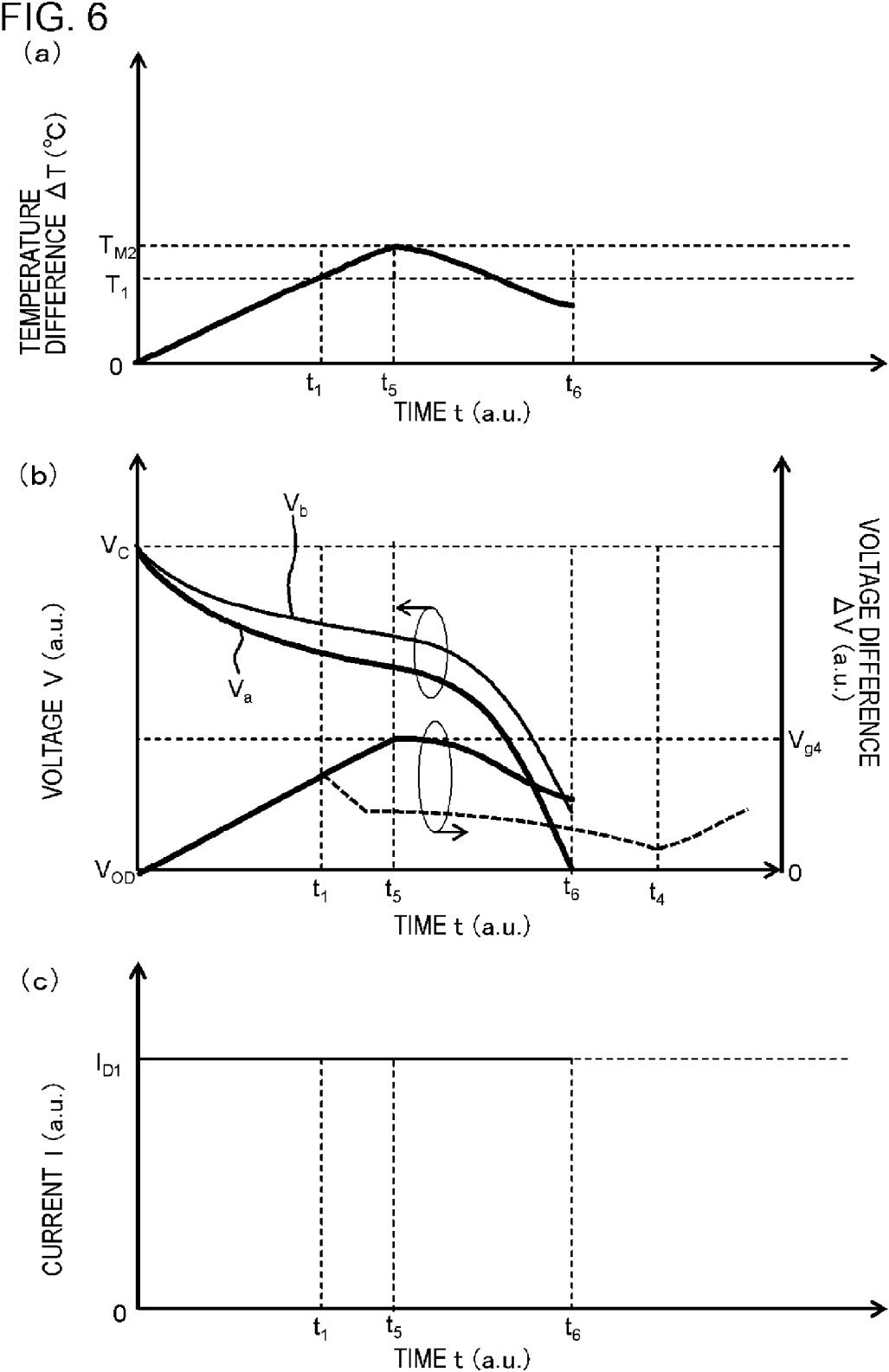
FIG. 6 is a diagram illustrating a comparative example for describing an effect of the first embodiment.

Next, an effect of the first embodiment will be described using FIG. 6 as a comparative example. FIG. 6 is a diagram illustrating a comparative example for describing the effect of the first embodiment.

Unlike the first embodiment, FIG. 6 shows a comparative example in which the battery control unit 400 does not perform control on the basis of the temperature of the battery cell 100. Meanwhile, as is the case with the first embodiment, discharge is started from a state where the full charge capacities of the respective battery cells 100 are equal to each other.

FIG. 6(a) shows a relationship between the time from the discharge start time, and the temperature difference $\Delta T$ between the highest temperature cell and the lowest temperature cell in the comparative example. FIG. 6(b) shows a relationship between the time from the discharge start time, and the voltage $V_a$ of the lowest temperature cell and the voltage $V_b$ of the highest temperature cell in the comparative example. In addition, the drawing shows a relationship between the time from the discharge start time, and the voltage difference $\Delta V$ between the voltage $V_b$ of the highest temperature cell and the voltage $V_a$ of the lowest temperature cell in the comparative example. Meanwhile, dotted lines in the drawing show the voltage difference $\Delta V$ in the first embodiment. In addition, FIG. 6(c) shows a relationship between the time from the discharge start time and the current of the battery cell 100 in the comparative example. Meanwhile, the interval of the horizontal axis in FIG. 6 is the same as the interval of the horizontal axis in FIG. 4.

As shown in FIG. 6(c), the load 600 operates at a constant current due to the load control unit 640. That is, the current is assumed to be always kept constant at the constant current value $I_{D1}$.

As shown in FIG. 6(a), in the comparative example, the temperature difference $\Delta T$ between the highest temperature cell and the lowest temperature cell also increases monotonically in a case of the initial step of the discharge at earlier than time $t_1$.

In FIG. 6(a), at time $t_1$, the temperature difference $\Delta T$ between the highest temperature cell and the lowest temperature cell becomes the reference value $T_1$. After time $t_1$, the temperature difference $\Delta T$ further increases. As described above, a resistance difference between the highest temperature cell and the lowest temperature cell occurs due to the temperature difference $\Delta T$. In addition, the amount of heat generation due to the internal resistance of the lowest temperature cell becomes larger than that of the highest temperature cell. For this reason, an increase in temperature difference $\Delta T$ becomes gentle with elapse of time. At time $t_5$ slower than time $t_2$, the temperature difference $\Delta T$ in the comparative example becomes a maximum value $T_{M2}$ larger than the maximum value $T_M$ in the first embodiment. After time $t_5$, the temperature difference $\Delta T$ is reduced.

As shown in FIG. 6(b), from the discharge start, a difference in internal resistance between the highest temperature cell and the lowest temperature cell becomes larger in association with an increase in temperature difference $\Delta T$. For this reason, the voltage difference $\Delta V$ between the highest temperature cell and the lowest temperature cell becomes larger. Further, during time $t_1$ to time $t_5$, the voltage difference $\Delta V$ between the highest temperature cell and the lowest temperature cell becomes much larger. At time $t_5$, the voltage difference $\Delta V$ in the comparative example becomes a maximum value $V_{g4}$ larger than the maximum value $V_{g0}$ in the first embodiment.

Further, when the discharge is continued, at time $t_6$, the voltage $V_a$ of the lowest temperature cell becomes equal to or less than the over-discharge detection voltage value $V_{OD}$. In this case, the discharge of the battery pack 10 is terminated forcibly.

In this manner, in the comparative example, even when the full charge capacities of the respective battery cells 100 are equal to each other, the voltage of each of the battery cells 100 varies due to the internal resistance difference caused by the temperature difference $\Delta T$. In addition, in the comparative example, the above-mentioned temperature difference $\Delta T$ becomes the maximum value $T_{M2}$ larger than the maximum value $T_M$ in the first embodiment. For this reason, there is the possibility of the voltage of each of the battery cells 100 varying greatly dependent on the temperature difference $\Delta T$. In addition, in the comparative example, when the discharge is continued, there is the possibility of the lowest temperature cell being over-discharged in a state where the residual capacity of all the battery cells 100 remains. When the battery cell 100 which is a lithium-ion secondary battery becomes in an over-discharged state, a phenomenon occurs in which a positive electrode material is eluted, or an electric collector of a negative electrode is eluted, and the battery cell does not function as a secondary battery. Particularly, when the battery pack 10 is under the low-temperature environment, and a current during discharge is large, there is the high possibility of the lowest temperature cell being over-discharged.

In this manner, in the comparative example, there is the possibility of the battery pack 10 not being able to be stably discharged due to the temperature difference between the battery cells 100.

On the other hand, according to the first embodiment, the battery control unit 400 outputs the first signal when the first condition in which the temperature difference $\Delta T$ between the highest temperature cell and the lowest temperature cell is equal to or greater than the reference value $T_1$ is satisfied. When the first signal is received, the electronic device 60 can perform control for reducing the current in the discharge. In the first embodiment, it is possible to obtain the following effect by performing the above control.

According to the first embodiment, the current in the discharge is reduced by the load control unit 640, and thus it is possible to reduce the voltage drop component due to the internal resistance of each of the battery cells 100. Thereby, it is possible to reduce the voltage difference between each of the battery cells 100.

In addition, according to the first embodiment, it is possible to suppress the over-discharge of the lowest temperature cell. As described in the above-mentioned comparative example, when the voltage difference $\Delta V$ occurs due to the temperature difference $\Delta T$, the continuation of the discharge as it is causes only the lowest temperature cell to be over-discharged. In this case, there is the possibility of all the battery cells 100 not being able to be discharged with the residual capacity remaining. On the other hand, according to the first embodiment, the battery control unit 400 can transfer the increasing temperature difference $\Delta T$ to the electronic device 60 by outputting the first signal. Thereby, it is possible to prevent the lowest temperature cell from being over-discharged beforehand, and to sustain the discharge of the battery pack 10 for a long time.

In addition, according to the first embodiment, when the battery pack 10 is particularly under the low-temperature environment, it is possible to suppress the increase of a difference in internal resistance between each of the battery cells 100. As shown in FIG. 4, the internal resistance between the battery cells 100 has a tendency to increase drastically as the temperature becomes lower. For this reason, even when a slight temperature difference occurs between the battery cells 100, there is the possibility of a large voltage difference occurring. In such a case, it is possible to suppress a voltage variation appropriately by performing the control.

As described above, according to the first embodiment, it is possible to stably discharge the battery pack 10.

As described above, in the first embodiment, a case where the electronic device 60 is a liquid crystal display device has been described, but the electronic device may be a display device including a plurality of light-emitting units such as an organic EL element as pixels. In this case, when the load control unit 640 receives the first signal, it is possible to reduce, for example, a current flowing through all the light-emitting units.

In addition, in the first embodiment, the load control unit 640 reduces the current on the load 600 side on the basis of the "first signal", but may control the current on the basis of the voltage difference $\Delta V$. In this case, the battery control unit 400 and the load control unit 640 can further perform the following control.

The first signal includes the voltage difference signal indicating the voltage difference $\Delta V$ between the highest temperature cell and the lowest temperature cell. The load control unit 640 includes a storage unit (not shown) that stores the first reference voltage value $V_{g1}$, and an arithmetic operation unit (not shown) that compares the voltage difference signal with the first reference voltage value $V_{g1}$.

When the first signal is received, the load control unit 640 reduces a current until the voltage difference $\Delta V$ becomes equal to or less than the first reference voltage value $V_{g1}$, on the basis of the voltage difference signal. In addition, the load control unit 640 may perform control so that the current is reduced greatly as the voltage difference $\Delta V$ becomes larger. On the other hand, the battery control unit 400 stops outputting the first signal when the voltage difference $\Delta V$ becomes equal to or less than the first reference voltage value $V_{g1}$ after the first signal is output.

In this manner, the load control unit 640 can perform control for reducing a current, using the voltage difference $\Delta V$ between the highest temperature cell and the lowest temperature cell as an index of a voltage variation between each of the battery cells 100 within the battery pack 10. That is, it is possible to suppress the voltage variation between the battery cells 100 in accordance with not only the temperature difference $\Delta T$ but also the magnitude of the voltage difference $\Delta V$ occurring in reality. Thereby, it is possible to suppress an increase in voltage drop due to only the lowest temperature cell protruding. Therefore, it is possible to prevent the discharge of the lowest temperature cell from being terminated due to over-discharge in a state where the residual capacity of all the battery cells 100 remains.

Second Embodiment

Figure 7:
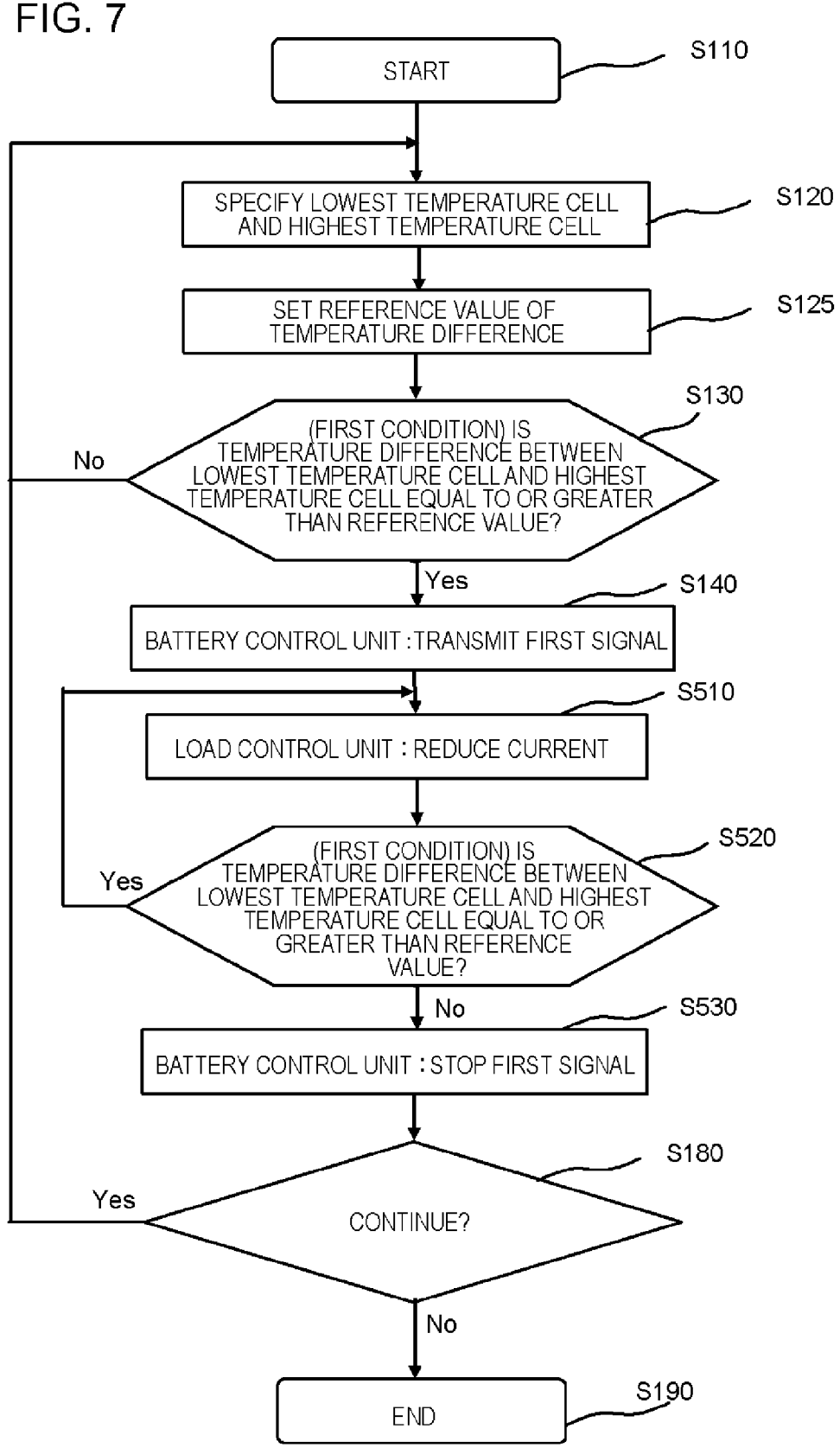
FIG. 7 is a flow diagram illustrating a control method according to a second embodiment.
Figure 8:
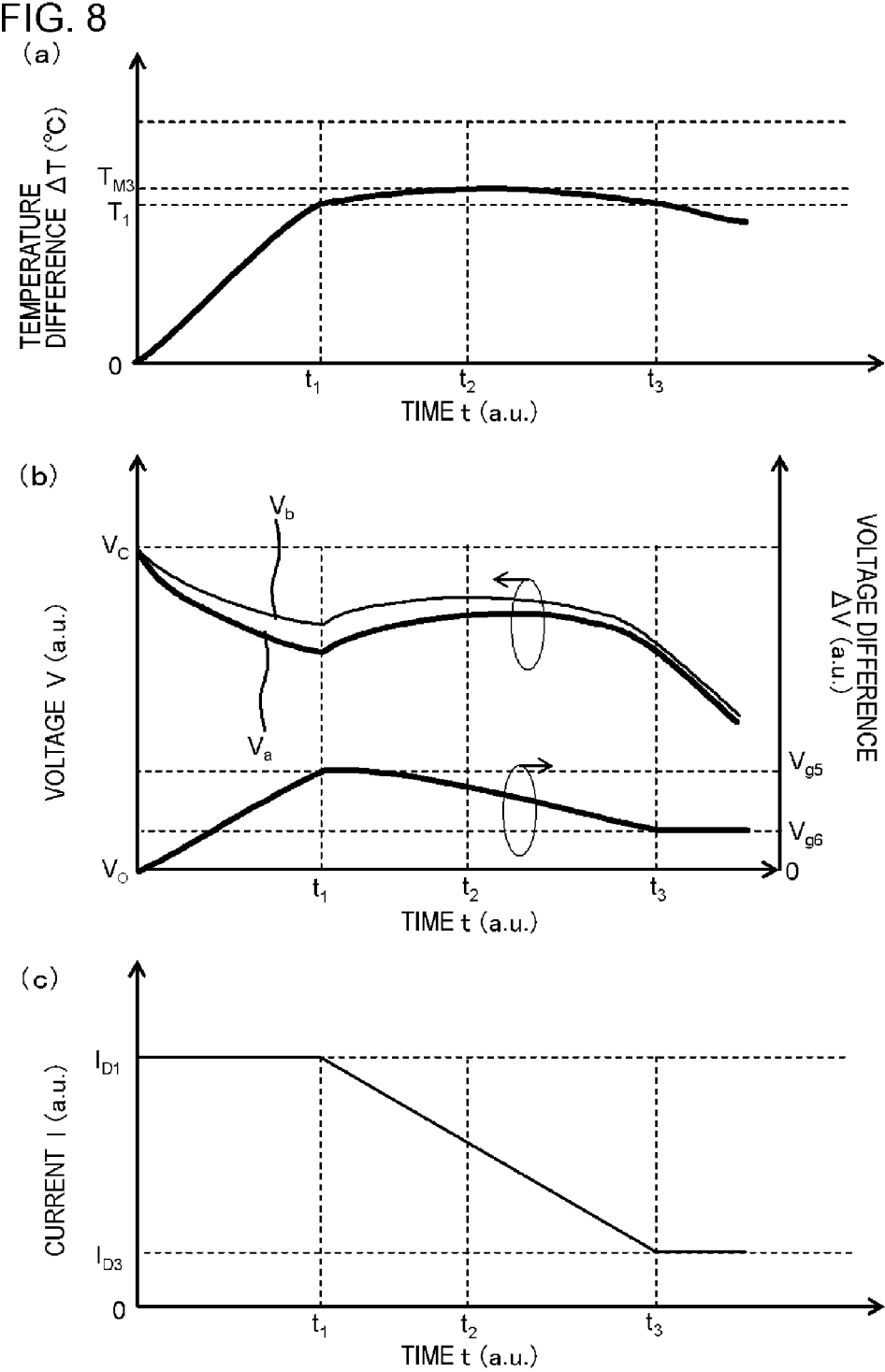
FIG. 8 is a diagram illustrating a control method according to the second embodiment.

A second embodiment will be described with reference to FIGS. 7 and 8. FIG. 7 is a flow diagram illustrating a control method according to the second embodiment. In addition, FIG. 8 is a diagram illustrating a control method according to the second embodiment. The second embodiment is the same as the first embodiment, except that control based on the voltage difference is not performed. Hereinafter, a detailed description will be given. Meanwhile, the horizontal axis of FIG. 8 is assumed to be independent of FIG. 3.

In the first embodiment, a description has been given in which the battery control unit 400 transmits the first signal, and then the battery control unit 400 and the load control unit 640 perform control on the basis of the voltage difference ΔV between the highest temperature cell and the lowest temperature cell. However, as described below in the second embodiment, the battery control unit 400 can also perform control on the basis of only the temperature difference ΔT.

In addition, in the second embodiment, a case will be described in which the temperature difference ΔT between the highest temperature cell and the lowest temperature cell increases over time. Specifically, the battery pack 10 may include a large number of battery cells 100, and be used under the low-temperature environment. That is, in the inside battery cell 100 within the battery pack 10, heat is not likely to escape during the generation of heat, whereas in the outside battery cell 100 of the battery pack 10, heat has a tendency to dissipate to the outside.

First, in the flow diagram of FIG. 7, discharge from a plurality of battery cells 100 is started. At the same time, temperature measurement performed by the temperature measurement unit 300 and voltage and current measurement performed by the voltage and current measurement unit 200 are started (S110).

Next, the battery control unit 400 specifies the lowest temperature cell having the lowest temperature and the highest temperature cell having the highest temperature on the basis of the temperature measured by the temperature measurement unit 300 (S120). Specifically, for example, the battery cell 100 (Cell 1 in FIG. 1) which is disposed at the outermost side becomes the lowest temperature cell. On the other hand, the battery cell 100 (Cell 3 in FIG. 1) which is located near the center of the battery pack 10 becomes the highest temperature cell.

Here, Joule heat is emitted due to the internal resistance or the like of the battery cell 100. The temperature of each of the battery cells 100 rises due to the Joule heat.

FIG. 8(a) shows a relationship between the time from the discharge start time, and the temperature difference ΔT between the highest temperature cell and the lowest temperature cell in the first embodiment. Here, for example, a rise in the temperature of the highest temperature cell is fast. On the other hand, a rise in the temperature of the lowest temperature cell is slow. The temperature difference ΔT between the highest temperature cell and the lowest temperature cell increases monotonically, for example, simultaneously with the discharge start.

In FIG. 8(c), the load 600 is assumed to operate at a constant current by the load control unit 640. For this reason, discharge until time $t_1$ is constant current discharge. Therefore, the current of all the battery cells 100 is kept constant at a constant current value $I_{D1}$.

In addition, as described above, it is assumed that a rise in the temperature of the highest temperature cell is fast, and that a rise in the temperature of the lowest temperature cell is slow. For this reason, a difference in internal resistance between the highest temperature cell and the lowest temperature cell increases over time.

As shown in FIG. 8(b), the voltage $V_a$ of the lowest temperature cell drops faster than the voltage $V_b$ of the highest temperature cell due to the difference in internal resistance. In addition, the voltage difference ΔV between the highest temperature cell and the lowest temperature cell increases due to the above-mentioned change in internal resistance over time.

Next, the battery control unit 400 sets the "reference value $T_1$ of the temperature difference ΔT" (S125). Here, for example, as is the case with the first embodiment, the "reference value $T_1$ of the temperature difference ΔT" is set on the basis of the temperature of the lowest temperature cell.

Next, the battery control unit 400 determines the first condition in which the temperature difference ΔT between the highest temperature cell and the lowest temperature cell is equal to or greater than the reference value $T_1$ (S130).

When the first condition in which the temperature difference ΔT between the highest temperature cell and the lowest temperature cell is equal to or greater than the reference value $T_1$ is not satisfied (S130; No), the battery control unit 400 continues the discharge as it is.

On the other hand, when the temperature difference ΔT satisfies the first condition (S130; Yes), the battery control unit 400 outputs the first signal (S140).

Here, in FIGS. 8(a), 8(b) and 8(c), the time when the first condition is satisfied (S130 Yes) is time $t_1$. As shown in FIG. 8(a), the temperature difference ΔT between the highest temperature cell and the lowest temperature cell becomes the reference value $T_1$. Therefore, the temperature difference ΔT is a state where the first condition is satisfied.

In addition, as shown in FIG. 3(b), at time $t_1$, the voltage difference ΔV between the highest temperature cell and the lowest temperature cell increases up to $V_{g6}$.

Here, the battery control unit 400 and the load control unit 640 perform control based on only the temperature difference ΔT between the highest temperature cell and the lowest temperature cell as follows.

When the first signal is received from the battery control unit 400 at time $t_1$, the load control unit 640 reduces a current (S510).

As shown in FIG. 8(c), after time $t_1$, the load control unit 640 reduces a current linearly, for example, from the constant current value $I_{D1}$. Meanwhile, even when the amount of current reduction of the load control unit 640 is arbitrary, it is possible to obtain the same effect.

In addition, as shown in FIG. 8(a), immediately after time $t_1$, the highest temperature cell maintains the temperature to be high due to the generation of heat caused by the discharge. For this reason, the load control unit 640 reduces a current in S510, and thus the temperature difference ΔT between the highest temperature cell and the lowest temperature cell is not reduced immediately. On the other hand, the current is reduced by the load control unit 640, and thus an increase in temperature difference ΔT becomes gentle after time $t_1$.

In addition, as shown in FIG. 8(b), until time $t_1$, the voltage $V_a$ of the lowest temperature cell drops much lower than the voltage $V_b$ of the highest temperature cell. After time $t_1$, the current is reduced by the load control unit 640, and thus a voltage drop component due to the internal resistance is reduced. That is, after time $t_1$, the voltage $V_a$ of the lowest temperature cell comes close to the voltage $V_b$ of the highest temperature cell.

Next, after the first signal is output, the battery control unit 400 determines again the first condition in which the temperature difference ΔT between the highest temperature cell and the lowest temperature cell is equal to or greater than the reference value $T_1$ (S520).

After time $t_1$, when the temperature difference ΔT satisfies the first condition (S520; Yes), the load control unit 640 continues control for further reducing a current (S510).

As shown in FIG. 8(a), after time $t_1$, the heat generation of the entire battery pack 10 is suppressed by reducing the current when the load control unit 640 receives the first signal. Thereby, an increase in temperature difference ΔT can be made gentle. At time $t_2$, the temperature difference ΔT becomes a maximum value $T_{M3}$. Further, after time $t_2$, the temperature difference ΔT drops gently in association with a further reduction in current in the discharge.

As shown in FIG. 8(c), even after time $t_2$, the load control unit 640 continues control for reducing a current.

As shown in FIG. 8(b), even after time $t_2$, the voltage $V_a$ of the lowest temperature cell gradually comes close to the voltage $V_b$ of the highest temperature cell.

As shown in FIG. 8(a), further, the load control unit 640 performs the control for reducing a current, and thus the temperature difference ΔT becomes less than the reference value $T_1$ at time $t_3$. That is, the temperature difference ΔT does not satisfy the first condition.

As in a case of time $t_3$, when the first signal is output, and then the first condition in which the temperature difference ΔT is equal to or greater than the reference value $T_1$ is not satisfied (S520; No), the battery control unit 400 stops the first signal (S530). Accordingly, the load control unit 640 stops the control for reducing a current by controlling the load 600.

As shown in FIG. 8(c), after time $t_3$, for example, the load control unit 640 performs control so that the current is kept constant at the constant current value $I_{D3}$.

As shown in FIG. 8(b), after time $t_3$, the voltages of the lowest temperature cell and the highest temperature cell drop in association with a reduction in residual capacity. Thereby, even after time $t_3$, it is possible to suppress an increase in voltage difference ΔV.

Next, it is determined whether the discharge of the battery pack 10 is continued (S180). When the discharge is continued (S180; Yes), the battery control unit 400 controls the battery pack 10 again on the basis of the temperature difference ΔT between the highest temperature cell and the lowest temperature cell.

On the other hand, when the discharge of the battery pack 10 is not continued (S180; No), the use of the electronic device 60 is terminated, and the discharge of the battery pack 10 is terminated (S190).

As described above, the battery pack 10 according to the second embodiment is controlled.

Figure 9:
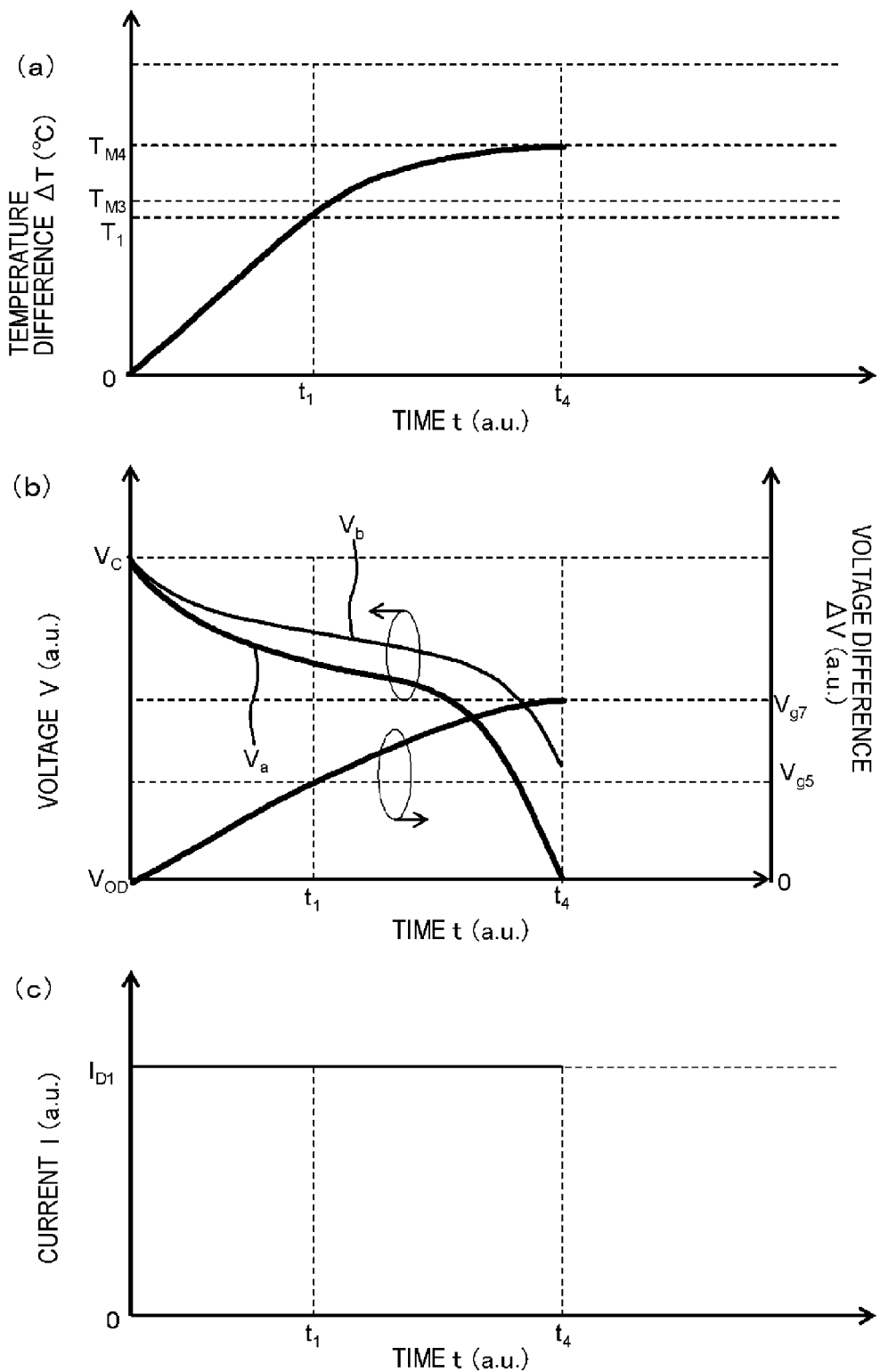
FIG. 9 is a diagram illustrating a comparative example for describing an effect of the second embodiment.

Next, an effect of the second embodiment will be described using FIG. 9 as a comparative example. FIG. 9 is a diagram illustrating a comparative example for describing an effect of the second embodiment.

Unlike the second embodiment, FIG. 9 shows a comparative example in which the battery control unit 400 does not perform control on the basis of the temperature of the battery cell 100. Meanwhile, as is the case with the second embodiment, discharge is started from a state where the full charge capacities of the respective battery cells 100 are equal to each other.

FIG. 9(a) shows a relationship between the time from the discharge start time, and the temperature difference ΔT between the highest temperature cell and the lowest temperature cell in the comparative example. FIG. 9(b) shows a relationship between the time from the discharge start time, and the voltage $V_a$ of the lowest temperature cell and the voltage $V_b$ of the highest temperature cell in the comparative example. In addition, the drawing shows a relationship between the time from the discharge start time, and the voltage difference ΔV between the voltage $V_b$ of the highest temperature cell and the voltage $V_a$ of the lowest temperature cell in the comparative example. In addition, FIG. 9(c) shows a relationship between time from the discharge start time and the current of the battery cell 100 in the comparative example. Meanwhile, the interval of the horizontal axis in FIG. 9 is assumed to be the same as the interval of the horizontal axis in FIG. 8.

As shown in FIG. 9(c), the load 600 is operated at a constant current by the load control unit 640. That is, the current is assumed to be always kept constant at the constant current value $I_D$.

As shown in FIG. 9(a), in the comparative example, the temperature difference ΔT between the highest temperature cell and the lowest temperature cell is also assumed to increase monotonically simultaneously with the discharge start.

In FIG. 9(a), at time $t_1$, the temperature difference ΔT between the highest temperature cell and the lowest temperature cell is the reference value $T_1$. In addition, as described above, a rise in the temperature of the highest temperature cell is fast, and a rise in the temperature of the lowest temperature cell is slow. For this reason, even after time $t_1$, the temperature difference ΔT further continues to rise. The temperature difference ΔT in the comparative example further exceeds the maximum value $T_{M3}$ in the second embodiment.

As shown in FIG. 9(b), from the discharge start, the voltage difference ΔV between the highest temperature cell and the lowest temperature cell increases. Further, even after time $t_1$, a difference in internal resistance between the highest temperature cell and the lowest temperature cell increases. For this reason, the voltage difference ΔV between the highest temperature cell and the lowest temperature cell increases over time.

When the discharge is further continued, in FIG. 9(b), the voltage $V_a$ of the lowest temperature cell becomes equal to or less than the over-discharge detection voltage value $V_{OD}$ at time $t_4$. That is, the lowest temperature cell is over-discharged. In this case, the voltage difference ΔV increases up to a maximum value $V_{g7}$ larger than a maximum value $V_{g5}$ in the second embodiment.

In this manner, there is the possibility of the temperature difference ΔT increasing over time depending on the usage environment of the battery pack 10. For this reason, in the comparative example, even when the full charge capacities of the respective battery cells 100 are equal to each other, there is the possibility of the voltage difference between each of the battery cells 100 increasing over time. Therefore, in the comparative example, when the discharge is continued, there is the possibility of the lowest temperature cell being over-discharged in a state where the residual capacity of all the battery cells 100 remains.

On the other hand, according to the second embodiment, it is possible to obtain the same effect as that in the first embodiment. Further, according to the second embodiment, the battery control unit 400 and the load control unit 640 can perform control on the basis of only the temperature difference ΔT. The second embodiment is particularly effective, for example, in a case where the temperature difference ΔT increases over time, or the like. In addition, the second embodiment can be applied even to a case where a difference in initial full charge capacity in the battery cells 100 is present.

Further, according to the second embodiment, the current in the discharge is reduced by the load control unit 640, and thus it is possible to reduce the temperature difference ΔT between each of the battery cells 100. That is, it is possible to suppress the increase of a difference in internal resistance between each of the battery cells 100 due to the temperature difference ΔT.

Third Embodiment

Figure 10:
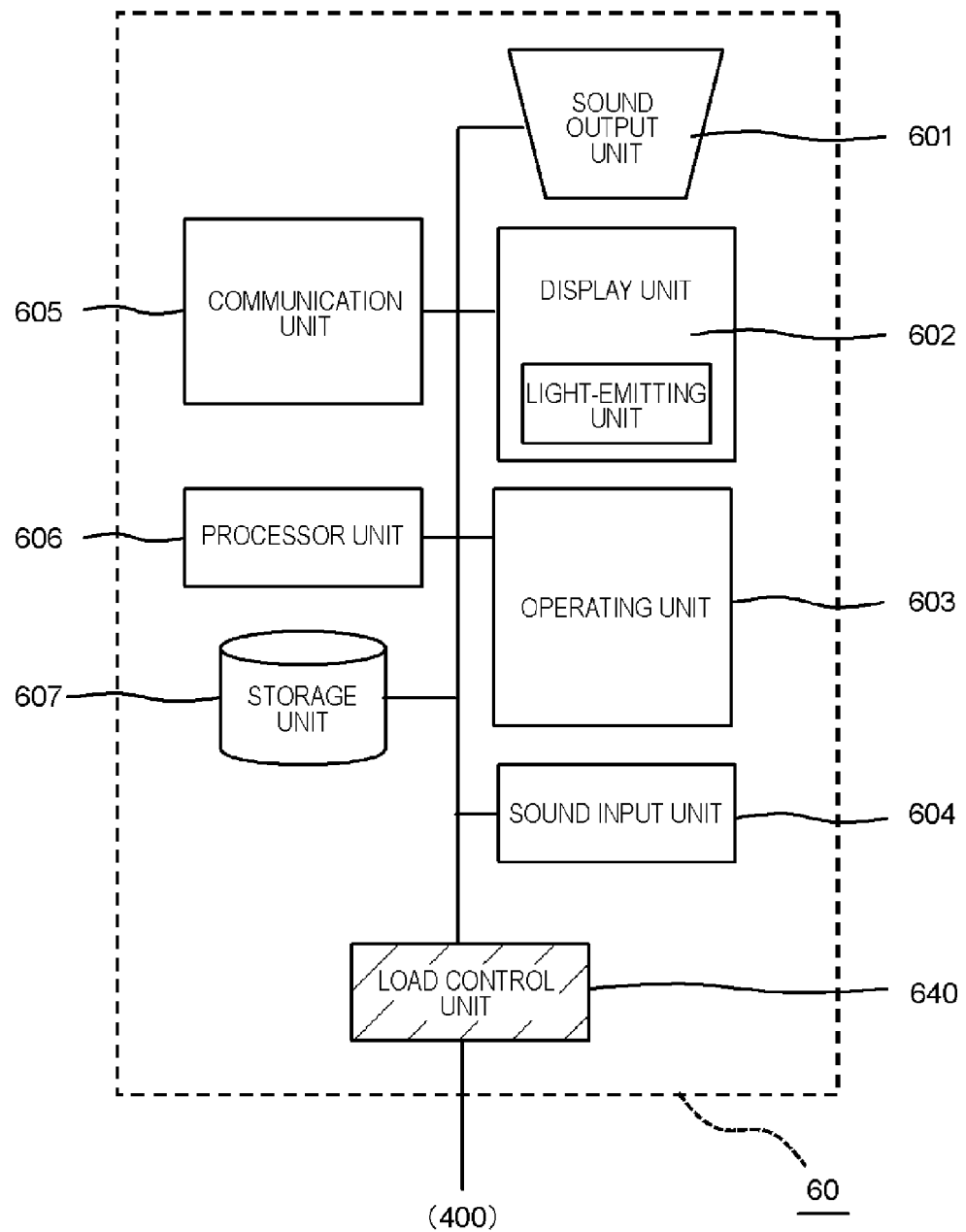
FIG. 10 is a schematic diagram illustrating a configuration of an electronic device according to a third embodiment.

FIG. 10 is a schematic diagram illustrating a configuration of an electronic device 60 according to a third embodiment.

The third embodiment is the same as the first embodiment, except that there are a plurality of loads 600. Hereinafter, a detailed description will be given.

Here, as shown in FIG. 10, the electronic device 60 according to the third embodiment is, for example, a portable communication terminal that performs a phone call or packet communication through the transmission and reception of electromagnetic waves.

This electronic device 60 includes, for example, a sound output unit (sound output unit 601), a display unit 602 provided with a light-emitting unit, an operating unit (operating unit 603), a sound input unit (sound input unit 604), a communication unit (communication unit 605), an arithmetic operation process unit (processor unit 606), a storage unit (storage unit 607) and a load control unit (load control unit 640). The arithmetic operation process unit (processor unit 606) is used for performing an arithmetic operation process of the electronic device 60.

The sound output unit 601 is a speaker that outputs a sound of a phone call. In addition, the sound input unit 604 is a microphone that inputs a sound of a phone call. In addition, the display unit 602 provided with a light-emitting unit is a liquid crystal display device that displays characters such as a phone number or a mail, and an image. In addition, the processor unit 606 performs an arithmetic operation process on a signal such as a sound signal of a phone call or data of packet communication. The storage unit 607 stores data such as a phone number or a mail. The communication unit 605 transmits and receives a signal such a sound signal or packets through electromagnetic waves. In this manner, the electronic device 60 of the third embodiment includes a plurality of loads 600.

The load control unit 640 is connected to the same battery pack 10 as that in the first embodiment, in a region which is not shown in the drawing. In addition, the load control unit 640 is connected to each of the loads 600 mentioned above. Thereby, the load control unit 640 can control the amount of power consumption of each of the loads 600.

Meanwhile, an interconnect (not shown) for supplying power to each of the loads 600 may not necessarily be connected to each of the loads 600 through the load control unit 640.

Here, a state of S140 in FIG. 2 is assumed. That is, this state is a state where the first condition in which the temperature difference ΔT between the highest temperature cell and the lowest temperature cell in the battery pack 10 is equal to or greater than the reference value $T_1$ is satisfied, and the battery control unit 400 transmits the first signal to the load control unit 640.

When all the loads 600 are used as they are, the voltage difference between the highest temperature cell and the lowest temperature cell further increases. In addition, there is the possibility of the lowest temperature cell being over-discharged. Consequently, when the first signal is received from the battery control unit 400, the load control unit 640 reduces the current of the load 600 as follows.

For example, as is the case with the first embodiment, the load control unit 640 gradually drops the luminance of the light-emitting unit (light-emitting unit of the display unit 602). In this manner, the load control unit 640 gradually reduces a current consumed in the load 600.

In addition, for example, the load control unit 640 lowers the processing speed of the arithmetic operation process unit (processor unit 606). Here, "lowers the processing speed of the processor unit 606" is to lower the clock frequency of the processor unit 606. In this manner, it is possible to reduce a current consumed in the processor unit 606 by lowering the clock frequency.

In addition, for example, the load control unit 640 controls the communication unit (communication unit 605) so as to restrict a phone call and perform only packet communication. In the transmission and reception of a sound signal through a phone call, power consumed in the communication unit 605 is greater than in the transmission and reception of a data signal through packet communication. In this manner, the load control unit 640 can impose a restriction of using only the load 600 having relatively small power consumption.

As described above, the load control unit 640 may gradually reduce the number of loads 600 that consume power at the present time. Thereby, it is possible to reduce the current in units of the loads 600.

According to the third embodiment, the electronic device 60 includes the plurality of loads 600. In such a case, when the first signal is received from the battery control unit 400, the load control unit 640 can appropriately select a method of reducing a current. The load control unit 640 may gradually reduce the number of loads 600 that consume power at the present time. Thereby, it is possible to reduce the current in units of the loads 600. Therefore, even when the electronic device 60 includes a plurality of loads 600, it is possible to suppress the occurrence of the voltage difference due to the temperature difference between each of the battery units.

Fourth Embodiment

Figure 11:
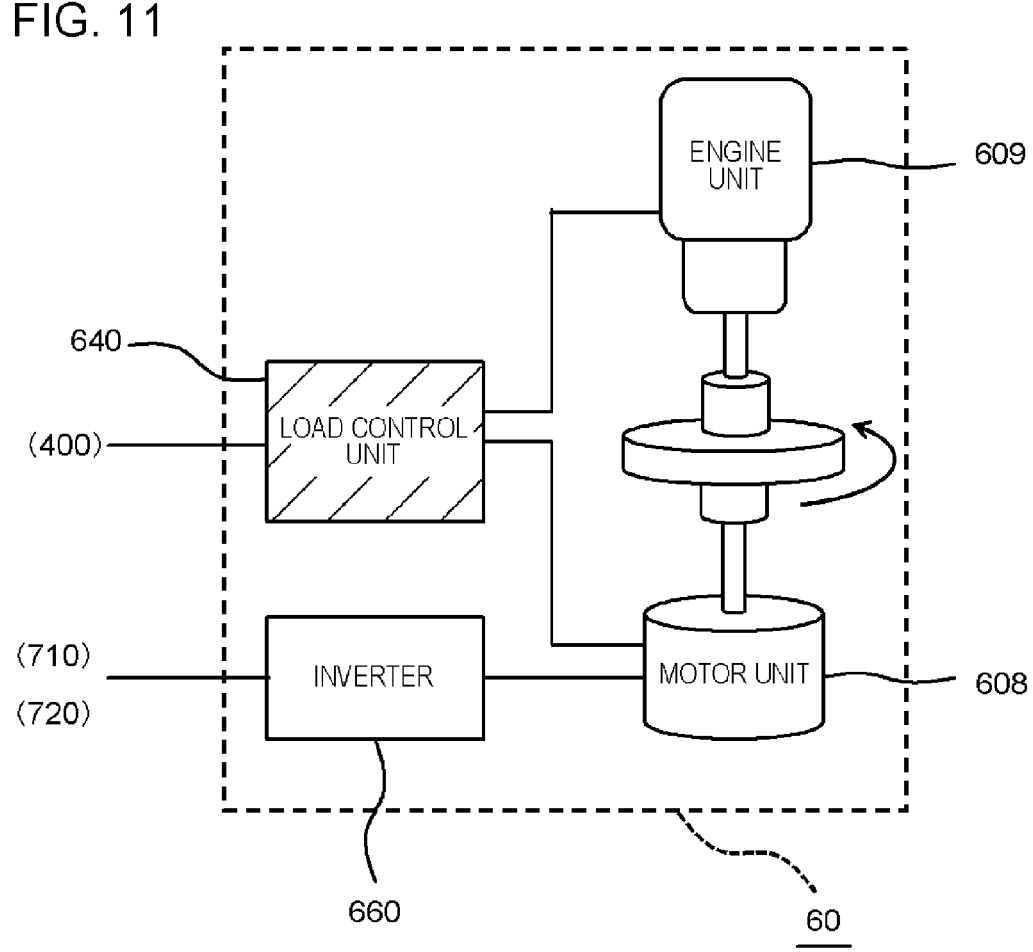
FIG. 11 is a schematic diagram illustrating a configuration of an electronic device according to a fourth embodiment.

FIG. 11 is a schematic diagram illustrating a configuration of an electronic device 60 according to a fourth embodiment. The fourth embodiment is the same as the first embodiment, except that the electronic device 60 is a motive power control device of a hybrid car or an electric automobile. Hereinafter, a detailed description will be given.

Here, as shown in FIG. 11, the electronic device 60 according to the fourth embodiment is, for example, a motive power control device such as a hybrid car. The same battery pack 10 as that in the first embodiment is mounted to the hybrid car, and is connected to the electronic device 60.

This electronic device 60 includes an electric drive unit (motor unit 608), a fuel drive unit (engine unit 609), a load control unit (load control unit 640) and an inverter 660. The load control unit 640 is connected to the battery control unit 400 of the battery pack 10, in a region which is not shown in the drawing. In addition, the inverter 660 is connected to the external positive electrode terminal 710 and the external negative electrode terminal 720 of the battery pack 10, in a region which is not shown in the drawing. Meanwhile, the electric drive unit (motor unit 608) is used for converting electrical energy into mechanical energy, and the fuel drive unit (engine unit 609) is used for converting combustion energy of fuel into mechanical energy.

The motor unit 608 converts, for example, power from the battery pack 10 into motive power of an automobile. In addition, the motor unit 608 converts the motive power of an automobile into power through the inverter 660, and can supply the converted power to the battery pack 10.

The engine unit 609 provides motive power to an automobile, for example, by burning gasoline. The load control unit 640 is connected to the motor unit 608 and the engine unit 609. Thereby, the load control unit 640 controls a ratio by which each of the loads 600 contributes to the motive power of an automobile.

Meanwhile, an interconnect (not shown) for supplying power to the motor unit 608 may not necessarily be connected through the load control unit 640.

Here, the hybrid car is driven by the motor unit 608, and is assumed to be in a state of S140 in FIG. 2. That is, this state is a state where the first condition in which the temperature difference $\Delta T$ between the highest temperature cell and the lowest temperature cell in the battery pack 10 is equal to or greater than the reference value $T_1$ is satisfied, and the battery control unit 400 transmits the first signal to the load control unit 640.

When only the motor unit 608 continues to be driven as it is, the voltage difference between the highest temperature cell and the lowest temperature cell further increases. In addition, there is the possibility of the lowest temperature cell being over-discharged. Consequently, when the first signal is received from the battery control unit 400, the load control unit 640 performs control as follows.

For example, the load control unit 640 reduces the power supply amount from the battery pack 10 to the electric drive unit (motor unit 608), and increases a drive ratio in the fuel drive unit (engine unit 609). In other words, the load control unit 640 performs control so that the contribution ratio to motive power becomes gradually larger in the engine unit 609. Meanwhile, the drive may be switched from the motor unit 608 to the engine unit 609. Thereby, it is possible to reduce a current consumed in the motor unit 608. In this manner, it is possible to perform gradual switching to the load 600 (engine unit 609) using other energy.

According to the fourth embodiment, it is possible to obtain the same effect as that in the first embodiment.

As described above, in the fourth embodiment, a case of the hybrid car has been described, but an electric automobile may be used. In this case, when the first signal is received from the battery control unit 400, the load control unit 640 reduces a current by reducing power which is supplied to the motor unit 608. Meanwhile, in this case, since there is only one motive power source, it is preferable that the load control unit 640 gradually reduce the current.

In addition, in the fourth embodiment, a case of the hybrid car has been described, but an electric power-assisted bicycle may be used. As described above, when the lowest temperature cell is over-discharged, there is the possibility of the discharge of the battery pack 10 being terminated forcibly. Consequently, when the first signal is received from the battery control unit 400, the load control unit 640 gradually reduces the power which is supplied to the motor unit 608. That is, the load control unit 640 weakens an assist force of the motor unit 608. Thereby, it is possible to use the motor unit 608 with little change in load felt by a user.

Fifth Embodiment

Figure 12:
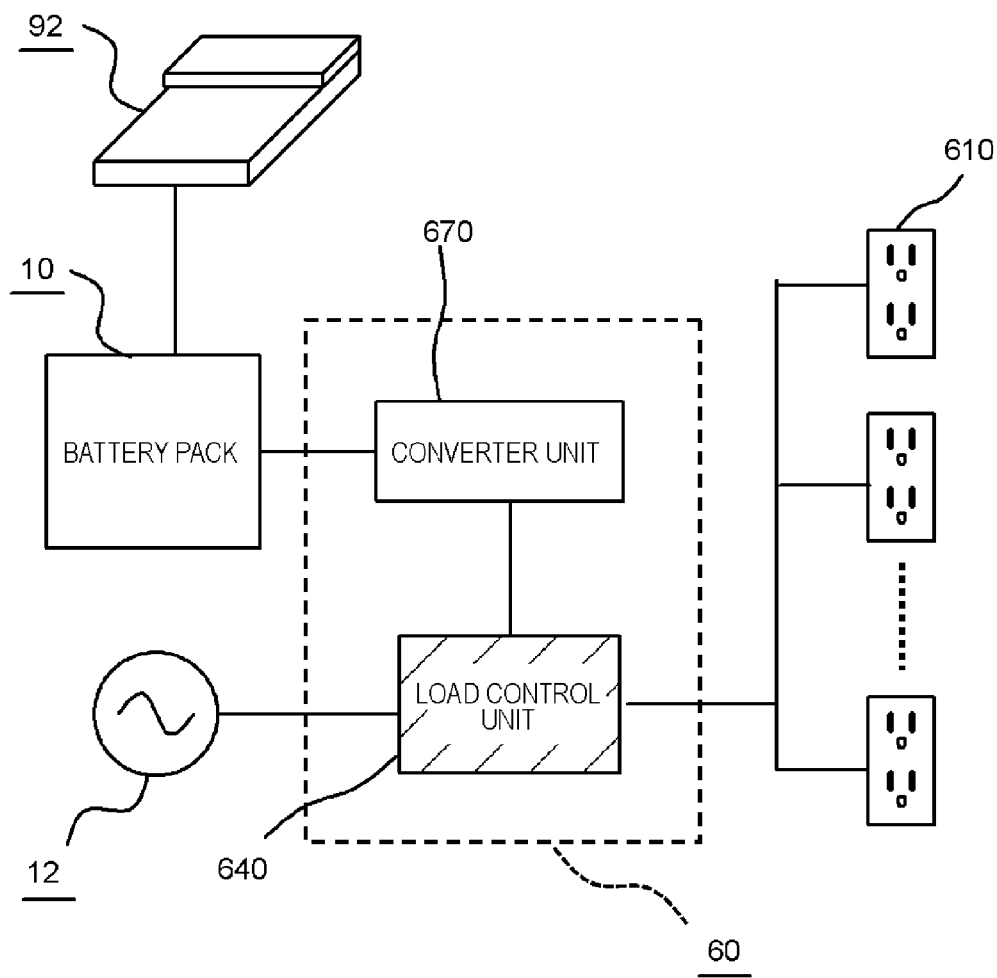
FIG. 12 is a schematic diagram illustrating a configuration of an electronic device according to a fifth embodiment.

FIG. 12 is a schematic diagram illustrating a configuration of an electronic device 60 according to a fifth embodiment. The fifth embodiment is the same as the first embodiment, except that the electronic device 60 is connected to at least one or more other power supply units (power supply units 12) other than the battery pack 10. Hereinafter, a detailed description will be given.

Here, as shown in FIG. 12, the electronic device 60 according to the fifth embodiment is, for example, a power control device that controls power from a plurality of power supply sources.

The same battery pack 10 as that in the first embodiment is connected to a solar battery 92. The solar battery 92 converts light energy of sunlight into power. When photovoltaic power is supplied from the solar battery 92, the battery pack 10 is charged by the power.

In addition, the electronic device 60 includes a converter unit 670 and a load control unit 640. The converter unit 670 converts a direct current supplied from the battery pack 10 into an alternating current. In addition, the converter unit 670 has a function of transmitting a first signal which is transmitted from the battery pack 10. Meanwhile, an interconnect (not shown) for transmitting the first signal from the battery pack 10 directly to the load control unit 640 may be connected thereto. In addition, the battery pack 10 is connected to the converter unit 670 of the electronic device 60.

The load control unit 640 is connected to other power supply units 12. The power supply unit 12 is, for example, a distribution switchboard of power which is supplied from an electric power company. For example, an alternating current is supplied from the power supply unit 12.

The load control unit 640 is connected to a plurality of household power supply receptacles 610. Various loads 600 are connected to the power supply receptacles 610 by a user.

Here, it is assumed that power is supplied to the power supply receptacles 610 from the battery pack 10. In addition, the battery pack 10 is assumed to be in a state of S140 in FIG. 2. That is, this state is a state where the first condition in which the temperature difference $\Delta T$ between the highest temperature cell and the lowest temperature cell in the battery pack 10 is equal to or greater than the reference value $T_1$ is satisfied, and the battery control unit 400 transmits the first signal to the load control unit 640.

When power is continuously consumed from only the battery pack 10 as it is, the voltage difference between the highest temperature cell and the lowest temperature cell further increases. In addition, there is the possibility of the lowest temperature cell being over-discharged.

Consequently, when the first signal is received from the battery control unit 400, the load control unit 640 reduces the power supply amount from the battery pack 10 to the power supply receptacles 610, and increases the power supply amount from other power supply units 12 to the power supply receptacles 610.

Meanwhile, a ratio by which the other power supply units 12 contribute may be gradually increased without discontinuously switching from the battery pack 10 to other power supply units 12.

According to the fifth embodiment, the electronic device 60 is connected to at least one or more other power supply units 12 other than the battery pack 10. For example, when the voltage difference between the highest temperature cell and the lowest temperature cell increases, and the lowest temperature cell is over-discharged, there is the possibility of the discharge of the battery pack 10 being terminated forcibly. For this reason, for example, when a user receives a supply of power from the battery pack 10, a failure of power supply occurs instantaneously. Therefore, when the first signal is received, the load control unit 640 reduces the power supply amount from the battery pack 10 to the power supply receptacles 610, and increases the power supply amount from other power supply units 12 to the power supply receptacles 610. Thereby, it is possible to prevent the lowest temperature cell of the battery pack 10 from being over-discharged. In addition, it is possible to sustain the discharge from the battery pack, and to continuously supply power to the load 600 side.

Sixth Embodiment

Figure 13:
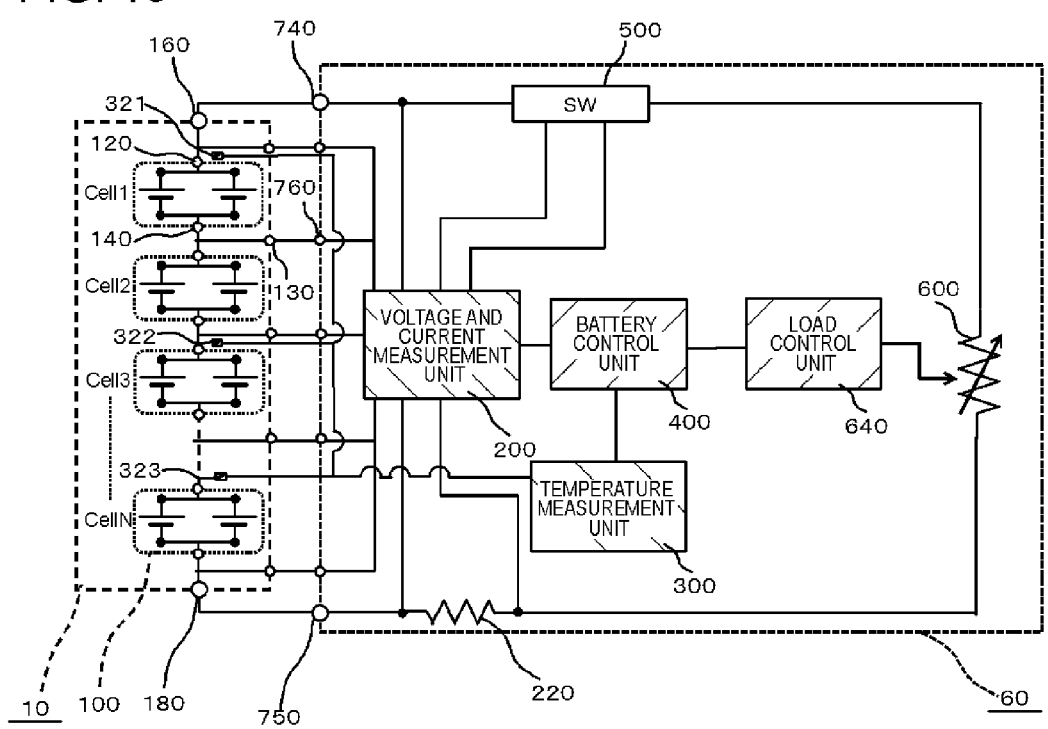
FIG. 13 is a circuit diagram illustrating a configuration of a battery pack and an electronic device according to a sixth embodiment.

FIG. 13 is a circuit diagram illustrating a configuration of a battery pack 10 and an electronic device 60 according to a sixth embodiment. The sixth embodiment is the same as the first embodiment, except that the control circuit 20 of the battery pack 10 in the first embodiment is included in the electronic device 60. Hereinafter, a detailed description will be given.

As shown in FIG. 13, the battery pack 10 of the sixth embodiment is not provided with the control circuit 20. That is, the battery pack 10 includes only a plurality of battery cells 100 which are connected in series to each other. The positive electrode terminal 160 is provided on the side of Cell 1 of the battery pack 10. On the other hand, the negative electrode terminal 180 is provided on the side of Cell N of the battery pack 10. In addition, a battery cell terminal 130 is provided between each of the battery cells 100.

The electronic device 60 of the sixth embodiment includes the voltage and current measurement unit 200, the temperature measurement unit 300, the battery control unit 400 and the switch 500 in addition to the load 600 and the load control unit 640. A measurement terminal 760 is provided on the battery pack 10 side of the electronic device 60.

In addition, a positive electrode terminal 740 and a negative electrode terminal 750 are provided on the battery pack 10 side of the electronic device 60. The positive electrode terminal 740 and the negative electrode terminal 750 of the electronic device 60 are respectively connected to the positive electrode terminal 160 and the negative electrode terminal 180 of the battery pack 10. Thereby, the electronic device 60 can receive a supply of power from the battery pack 10.

The temperature sensor 321, the temperature sensor 322 and the temperature sensor 323 of the temperature measurement unit 300 are inserted from an opening (not shown) provided to an exterior body (not shown) of the battery pack 10, and are installed on each of the battery cells 100.

In addition, the voltage and current measurement unit 200 is connected to the measurement terminal 760. The measurement terminal 760 of the electronic device 60 is connected to the battery cell terminal 130 of the battery pack 10 through an interconnect (no sign shown). Thereby, the voltage and current measurement unit 200 can measure the voltage of each of the battery cells 100.

According to the sixth embodiment, it is possible to obtain the same effect as that in the first embodiment. Further, according to the sixth embodiment, it is possible to simplify the battery pack 10 which is frequently exchanged.

Seventh Embodiment

Figure 14:
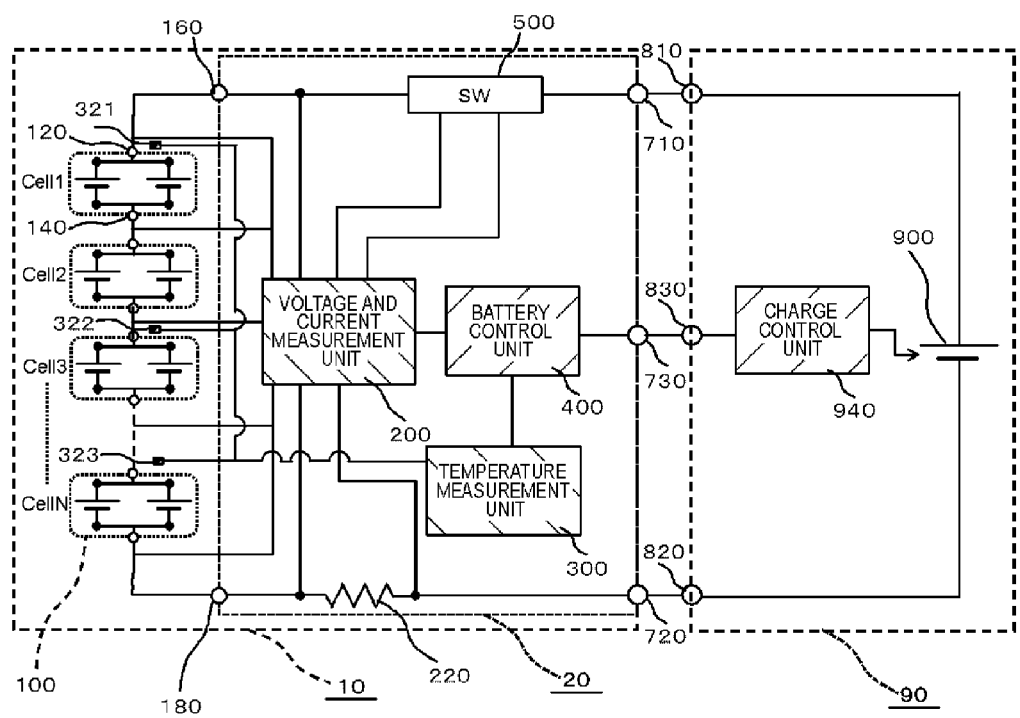
FIG. 14 is a circuit diagram illustrating a configuration of a battery pack and a charger according to a seventh embodiment.

A battery pack 10 according to a seventh embodiment will be described with reference to FIG. 14. FIG. 14 is a circuit diagram illustrating a configuration of a battery pack 10 and a charger 90 according to the seventh embodiment. The seventh embodiment is the same as the first embodiment, except that the charger 90 is connected to the battery pack 10. Hereinafter, a detailed description will be given.

The battery control unit 400 is connected to the voltage and current measurement unit 200. The battery control unit 400 can control the charge of each of the battery cells 100 on the basis of the temperature measured by the temperature measurement unit 300, or the like.

Next, the charger 90 connected to the battery pack 10 of the seventh embodiment will be described. This electronic device 60 includes a charge control unit (charge control unit 940). The charge control unit 940, connected to the battery control unit 400, receives the first signal and controls a voltage and a current in charge. In addition, when the first signal is received from the battery control unit 400, the charge control unit 940 reduces the current in the charge. Hereinafter, a detailed description will be given.

The charger 90 includes a power supply source 900. The power supply source 900 as used herein refers to a power source for charging the battery pack 10. The positive electrode terminal 810 and the negative electrode terminal 820 of the charger 90 are connected to the power supply source 900. Meanwhile, when the power supply source 900 is an alternating current, the charger 90 may include a converter unit (not shown) that converts an alternating current into a direct current.

The positive electrode terminal 810 and the negative electrode terminal 820 are provided on the battery pack 10 side of the charger 90. The positive electrode terminal 810 and the negative electrode terminal 820 of the charger 90 are respectively connected to the external positive electrode terminal 710 and the external negative electrode terminal 720 of the battery pack 10. Thereby, the charger 90 can charge the battery pack 10.

The charge control unit 940 is connected to the power supply source 900. Thereby, the charge control unit 940 controls the voltage and current of the power supply source 900.

In addition, the charge control unit 940 is connected to the communication terminal 830. The communication terminal 830 on the charger 90 side is connected to the communication terminal 730 on the battery pack 10 side through, for example, an interconnect (not shown). Thereby, the charge control unit 940 which is connected to the battery control unit 400 can receives the first signal.

When the first signal is received from the battery control unit 400, the charge control unit 940 can reduce a current in the charge. The details of such a charge control method will be described later.

Figure 15:
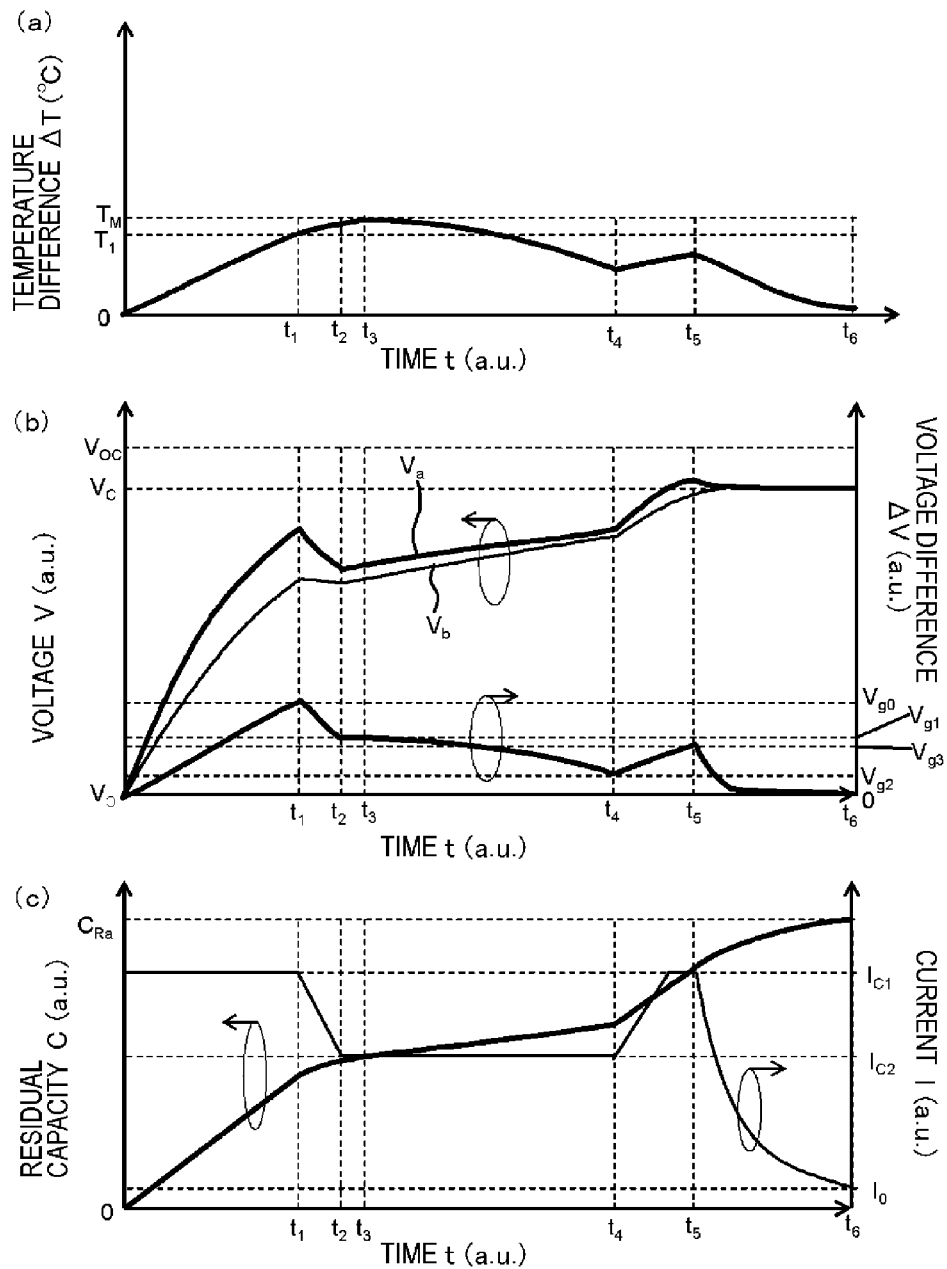
FIG. 15 is a diagram illustrating a control method according to the seventh embodiment.

Next, a method of controlling the above battery pack 10 will be described with reference to FIGS. 2, 3 and 15. Meanwhile, the "load control unit" in FIG. 3 is replaced by the "charge control unit". FIG. 15 is a diagram illustrating a charge control method according to the seventh embodiment. Meanwhile, time t and the like in FIG. 15 are independent of time t and the like in the above-mentioned embodiment. In the charge control method according to the seventh embodiment, discharge in the first embodiment is just replaced by charge, and the same steps are included. Hereinafter, a detailed description will be given.

Here, it is assumed that there is no residual capacity of all the battery cells 100 of the battery pack 10. The voltages of all the battery cells 100 in an initial step become a value close to a discharge termination voltage $V_0$.

First, in FIG. 2, the positive electrode terminal 810 and the negative electrode terminal 820 of the charger 90 are respectively connected to the external positive electrode terminal 710 and the external negative electrode terminal 720 of the battery pack 10. Thereby, the charge of the battery cells 100 is started (S110).

This charge is performed by a constant-current and constant-voltage charging method. The "constant-current and constant-voltage charging method" as used herein refers to a charge method in which the charge is performed with a constant charge current until the voltage of the entire battery pack 10 reached a specific charge voltage, and an applied voltage is fixed to the charge voltage after reaching the specific charge voltage. Here, for example, the above "charge voltage" is set to $NV_C$ so that the voltage of the battery cell 100 is set to a charge reference voltage value $V_C$. In addition, the "charge current" is set to $I_{C1}$.

Next, the battery control unit 400 specifies the lowest temperature cell and the highest temperature cell (S120). Further, the battery control unit 400 sets the reference value $T_1$ of the temperature difference $\Delta T$ (S125).

Here, FIG. 15(*a*) shows a relationship between the time from the charge start time, and the temperature difference $\Delta T$ between the highest temperature cell and the lowest temperature cell in the seventh embodiment. FIG. 15(*b*) shows a relationship between the time from the charge start time, and the voltage $V_a$ of the lowest temperature cell and the voltage $V_b$ of the highest temperature cell in the seventh embodiment. In addition, the drawing shows a relationship between the time from the discharge start time, and the voltage difference $\Delta V$ between the voltage $V_b$ of the highest temperature cell and the voltage $V_a$ of the lowest temperature cell in the first embodiment. In addition, FIG. 15(*c*) shows a relationship between the time from the charge start time and the current and residual capacity of the battery cell 100 in the seventh embodiment. Meanwhile, a difference in the residual capacity of the battery cell 100 is assumed to be negligibly small.

As shown in FIG. 15(*c*), until time $t_1$, charge at a constant current is performed by the charge control unit 940. That is, the current of all the battery cells 100 is kept constant at the constant current value $I_{C1}$.

As shown in FIG. 15(*a*), the temperature difference $\Delta T$ between the highest temperature cell and the lowest temperature cell increases monotonically in the initial step of the charge at earlier than time $t_1$.

As shown in FIG. 15(*b*), at earlier than time $t_1$, the voltage $V_a$ of the lowest temperature cell rises faster than the voltage $V_b$ of the highest temperature cell due to a difference in internal resistance.

Here, in FIG. 15(*a*), at time $t_1$, the temperature difference $\Delta T$ between the highest temperature cell and the lowest temperature cell becomes the reference value $T_1$. In this manner, when the first condition in which the temperature difference $\Delta T$ between the highest temperature cell and the lowest temperature cell is equal to or greater than the reference value $T_1$ is satisfied (S130; Yes), the battery control unit 400 outputs the first signal (S140). Meanwhile, as is the case with the first embodiment, the first signal includes, for example, a voltage difference signal indicating the voltage difference between the highest temperature cell and the lowest temperature cell.

In addition, as shown in FIG. 15(*b*), at time $t_1$, the voltage difference between the highest temperature cell and the lowest temperature cell increases up to $V_{g0}$.

Next, the battery control unit 400 and the charge control unit 940 perform control based on the voltage difference $\Delta V$ between the highest temperature cell and the lowest temperature cell, as follows (S400). As shown in FIG. 3, the charge control unit 940 having received the first signal reduces a current at time $t_1$ when the first signal is received from the battery control unit 400 (S410). In this case, when the first signal is received, the charge control unit 940 reduces the current until the voltage difference $\Delta V$ becomes equal to or less than the first reference voltage value $V_{g1}$, for example, on the basis of the voltage difference signal indicating the voltage difference $\Delta V$ between the highest temperature cell and the lowest temperature cell. In addition, the charge control unit 940 performs control so that the current is greatly reduced, for example, as the voltage difference $\Delta V$ becomes larger. Thereby, the charge control unit 940 can reduce the voltage difference between each of the battery cells 100 during electrification. Meanwhile, in this case, the charge control unit 940 controls the current to at least a chargeable current value or greater (value greater than 0).

In FIG. 15(*c*), after time $t_1$, the charge control unit 940 reduces the current. For example, as is the case with the first embodiment, the charge control unit 940 reduces the current linearly.

In addition, as shown in FIG. 15(*a*), after time $t_1$, for the following two reasons, an increase in temperature difference $\Delta T$ becomes gentle, and next, the temperature difference $\Delta T$ decreases. The first reason is because the heat generation of the entire battery pack 10 is suppressed by reducing the current when the first signal is received by the charge control unit 940. The second reason is because the Joule heat of the lowest temperature cell becomes larger than the Joule heat of the highest temperature cell by the arrangement of the battery cells 100. The amount of heat generation due to the internal resistance of the lowest temperature cell becomes larger than that of the highest temperature cell. Therefore, a temperature rise of the lowest temperature cell becomes faster than that of the highest temperature cell. In this manner, after time $t_1$, an increase in temperature difference $\Delta T$ becomes gentle, and next, the temperature difference $\Delta T$ decreases.

In FIG. 15(*b*), after time $t_1$, the charge control unit 940 reduces the current, and thus a component due to the internal resistance is reduced. In the seventh embodiment, after time $t_1$, for example, the voltage of each of the battery cells 100 drops by the decrement of the voltage drop component due to the internal resistance described above. Further, the voltage $V_a$ of the lowest temperature cell comes close to the voltage $V_b$ of the highest temperature cell.

As shown in FIG. 15(*c*), after time $t_1$, the charge control unit 940 reduces the current, and thus an increase in residual capacity becomes gentle.

Next, after the first signal is output, the battery control unit 400 determines whether the voltage difference $\Delta V$ between the highest temperature cell and the lowest temperature cell is equal to or less than the first reference voltage value $V_{g1}$ (S420).

After time $t_1$, when the voltage difference $\Delta V$ between the highest temperature cell and the lowest temperature cell is higher than the first reference voltage value $V_{g1}$ (S420; No), the load control unit 640 continues control for reducing a current (S410).

As shown in FIG. 15(*a*), further, the charge control unit 940 performs the control for reducing a current, and thus the voltage difference $\Delta V$ between the highest temperature cell and the lowest temperature cell becomes equal to or less than the first reference voltage value $V_{g1}$ at time $t_2$.

As in a case of time $t_2$, when the voltage difference $\Delta V$ between the highest temperature cell and the lowest temperature cell is equal to or less than the first reference voltage value $V_{g1}$ (S420; Yes), the battery control unit 400 stops the first signal (S430).

Accordingly, the charge control unit 940 stops control for reducing a current. Further, when the first signal is stopped, the charge control unit 940 performs control so that the current is set to be, for example, equal to or less than the present current value ($I_{D2}$) (S440). Here, when the first signal is stopped, the charge control unit 940 performs controls so that the current is kept constant, for example, at the present current value ($I_{D2}$). Thereby, the charge control unit 940 can stand by without increasing the voltage difference $\Delta V$ until the temperature difference $\Delta T$ decreases or the temperature difference $\Delta T$ becomes in an equilibrium state.

As shown in FIG. 15(*c*), after time $t_2$, for example, the charge control unit 940 performs control so that the current is kept constant at the constant current value $I_{C2}$.

As shown in FIG. 15(*a*), the temperature difference $\Delta T$ rises gently after time $t_2$, and the temperature difference $\Delta T$ becomes the maximum value $T_M$ at time $t_3$. After time $t_3$, the temperature difference $\Delta T$ decreases gradually.

As shown in FIG. 15(b), after time $t_3$, the voltages of the lowest temperature cell and highest temperature cell rise in association with an increase in residual capacity. In addition, the internal resistances of the highest temperature cell and the lowest temperature cell come close to each other in association with the above-mentioned reduction in temperature difference $\Delta T$. Thereby, after time $t_2$, the voltage difference $\Delta V$ between the highest temperature cell and the lowest temperature cell is further reduced.

Next, after the first signal is stopped, the battery control unit 400 determines whether the voltage difference $\Delta V$ between the highest temperature cell and the lowest temperature cell is equal to or less than the second reference voltage value $V_{g2}$ (S420). When the voltage difference $\Delta V$ is larger than the second reference voltage value $V_{g2}$ (S420; No), the charge control unit 940 continues the control of S440.

At time $t_4$, the temperature difference $\Delta V$ is reduced to the second reference voltage value $V_{g2}$ lower than the first reference voltage value $V_{g1}$. When the temperature difference $\Delta V$ is equal to or less than the second reference voltage value $V_{g2}$ (S450; Yes), the battery control unit 400 outputs, for example, a second signal which is different from the first signal (S460). When the second signal is received, the load control unit 640, for example, can increase a current. In other words, when the second signal is received, the charge control unit 940 can release control for setting the current to be set to be equal to or less than a constant value (S440). In this manner, the voltage difference $\Delta V$ becomes, for example, equal to or less than the second reference voltage value $V_{g2}$, and thus the charge control unit 940 determines that the temperature difference $\Delta T$ becomes in an equilibrium state, to thereby increase a current.

Next, it is determined whether the charge of the battery pack 10 is continued (S180). In this case, it may be determined whether the voltage of each of the battery cells 100 is equal to or higher than the over-charge detection voltage $V_{OC}$. When the charge is continued (S180; Yes), the battery control unit 400 controls the battery pack 10 again on the basis of the temperature difference $\Delta T$ between the highest temperature cell and the lowest temperature cell. When the temperature difference $\Delta T$ increases due to a change in the usage environment of the battery pack 10, or the like, the same control as described above is performed.

In FIG. 15(b), the voltage of the battery cell 100 rises by further performing the charge. At time $t_5$, the charge control unit 940 performs switching from constant current charge to constant voltage charge.

In FIG. 15(c), after time $t_5$, the charge control unit 940 gradually reduces the charge current from $I_{C1}$. At time $t_6$, the residual capacities of all the cells reach a full charge capacity value $C_{Ra}$. In addition, at time $t_6$, the current of the maximum voltage cell reaches a charge termination current value $I_0$. The "charge termination current value $I_0$" as used herein refers to a current value at the time of convergence on a constant value when the battery cell 100 comes close to full charge. Therefore, at time $t_6$, the charge control unit 940 terminates the charge (S190).

As described above, the battery pack 10 according to the seventh embodiment is controlled.

Figure 16:
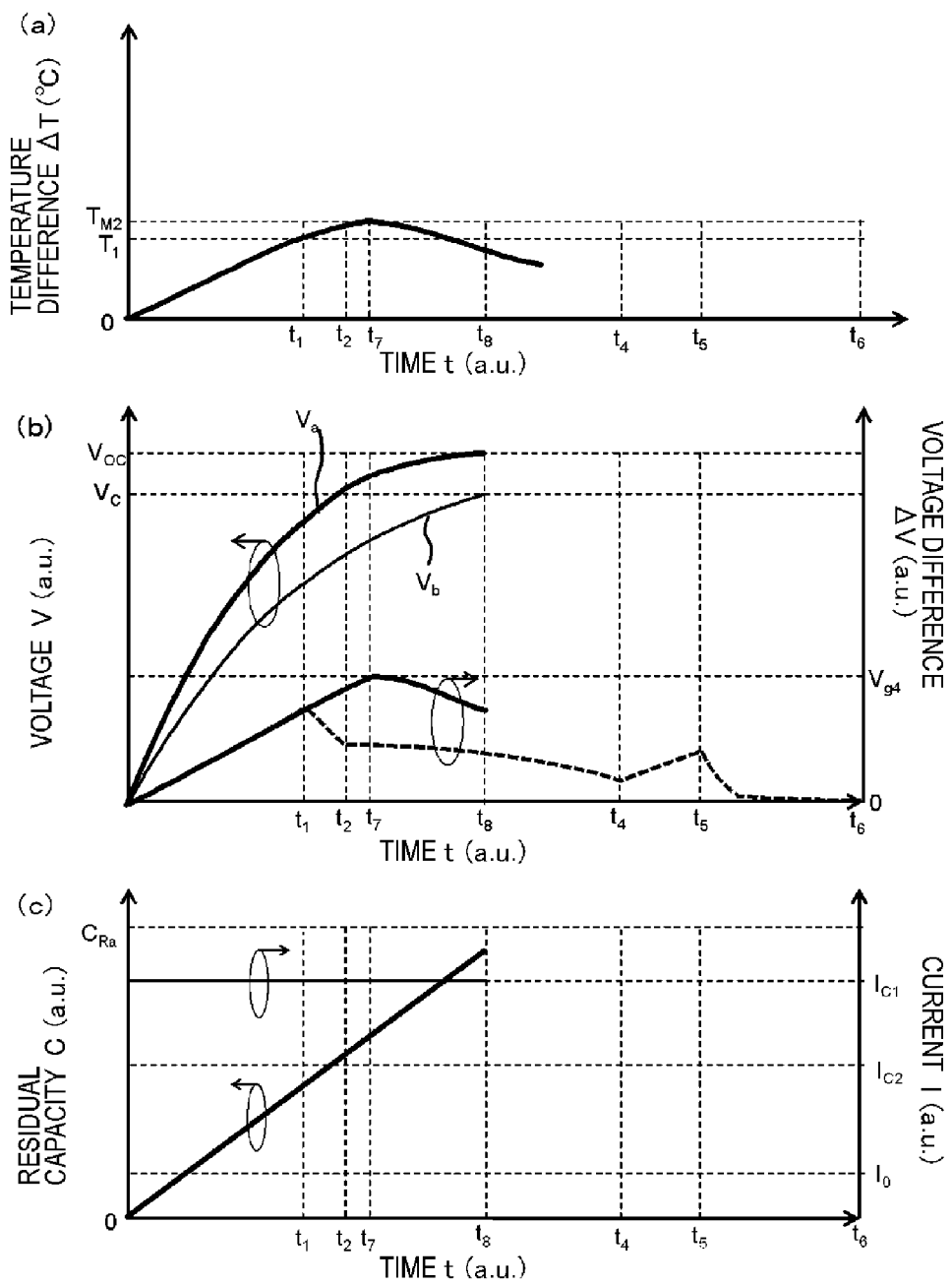
FIG. 16 is a diagram illustrating a comparative example for describing an effect of the seventh embodiment.

Next, an effect of the seventh embodiment will be described using FIG. 16 as a comparative example. FIG. 16 is a diagram illustrating a comparative example for describing an effect of the seventh embodiment.

Unlike the seventh embodiment, FIG. 16 shows a comparative example in which the battery control unit 400 does not perform control on the basis of a temperature. FIG. 16(a) shows a relationship between the time from the charge start time and the voltage of the battery cell 100 in the comparative example. In addition, FIG. 16(b) shows a relationship between the time from the charge start time and the current and residual capacity of the battery cell 100 in the comparative example. Meanwhile, time t of FIG. 16 is assumed to be the same as time t of FIG. 15.

As shown in FIG. 16(c), the charge control unit 940 performs charge at a constant current. That is, the current is assumed to be always kept constant at the constant current value $I_{C1}$.

As shown in FIG. 16(a), in the comparative example, the temperature difference $\Delta T$ between the highest temperature cell and the lowest temperature cell also increases monotonically in the initial step of the charge at earlier than time $t_1$.

In FIG. 16(a), at time $t_1$, the temperature difference $\Delta T$ between the highest temperature cell and the lowest temperature cell becomes the reference value $T_1$. After time $t_1$, the temperature difference $\Delta T$ further increases. As described above, a resistance difference between the highest temperature cell and the lowest temperature cell occurs due to the temperature difference $\Delta T$. In addition, the amount of heat generation due to the internal resistance of the lowest temperature cell becomes larger than that of the highest temperature cell. For this reason, an increase in temperature difference $\Delta T$ becomes gentle with a lapse of time. At time $t_7$ earlier than time $t_2$, the temperature difference $\Delta T$ in the comparative example becomes a maximum value $T_{M2}$ larger than the maximum value $T_M$ in the first embodiment. After time $t_7$, the temperature difference $\Delta T$ decreases.

As shown in FIG. 16(b), from the charge start, the voltage difference $\Delta V$ between the highest temperature cell and the lowest temperature cell increases. Further, during time $t_1$ to time $t_2$, a difference in internal resistance between the highest temperature cell and the lowest temperature cell increases in association with an increase in temperature difference $\Delta T$. For this reason, the voltage difference $\Delta V$ between the highest temperature cell and the lowest temperature cell further increases. At time $t_7$, the voltage difference $\Delta V$ in the comparative example becomes the maximum value $V_{g4}$ larger than the maximum value $V_{g0}$ in the first embodiment.

Further, when the charge is continued, at time $t_8$, the voltage $V_a$ of the lowest temperature cell becomes the over-charge detection voltage value $V_{OC}$. Meanwhile, the "over-charge detection voltage value $V_{OC}$" as used herein refers to, for example, an upper limit of a voltage in order for a defect such as fuming, ignition or burst not to occur in a lithium-ion secondary battery or the like. In this case, the battery control unit 400 of the battery pack 10 terminates the charge forcibly.

As shown in FIG. 16(c), at time $t_8$, the residual capacity C of all the battery cells 100 does not reach the full charge capacity value $C_{Ra}$.

In this manner, in the comparative example, even when the full charge capacities of the respective battery cells 100 are equal to each other, the voltage of each of the battery cells 100 varies due to the internal resistance difference caused by the temperature difference $\Delta T$. In addition, in the comparative example, the above-mentioned temperature difference $\Delta T$ becomes the maximum value $T_{M2}$ larger than the maximum value $T_M$ in the first embodiment. For this reason, there is the possibility of the voltage of each of the battery cells 100 varying greatly dependent on the temperature difference $\Delta T$. In addition, in the comparative example, when the charge is continued, there is the possibility of the lowest temperature cell being over-charged before all the battery cells 100 are full-charged.

On the other hand, according to the seventh embodiment, the battery control unit 400 outputs the first signal when the first condition in which the temperature difference ΔT between the highest temperature cell and the lowest temperature cell is equal to or greater than the reference value $T_1$ is satisfied. When the first signal is received, the charger 90 can perform control for reducing a current in the charge. Thereby, in the seventh embodiment, it is also possible to obtain the same effect as that in the first embodiment in the charge. That is, it is possible to suppress the over-charge of the lowest temperature cell. Therefore, according to the seventh embodiment, it is possible to stably charge the battery pack 10.

Eighth Embodiment

Figure 17:
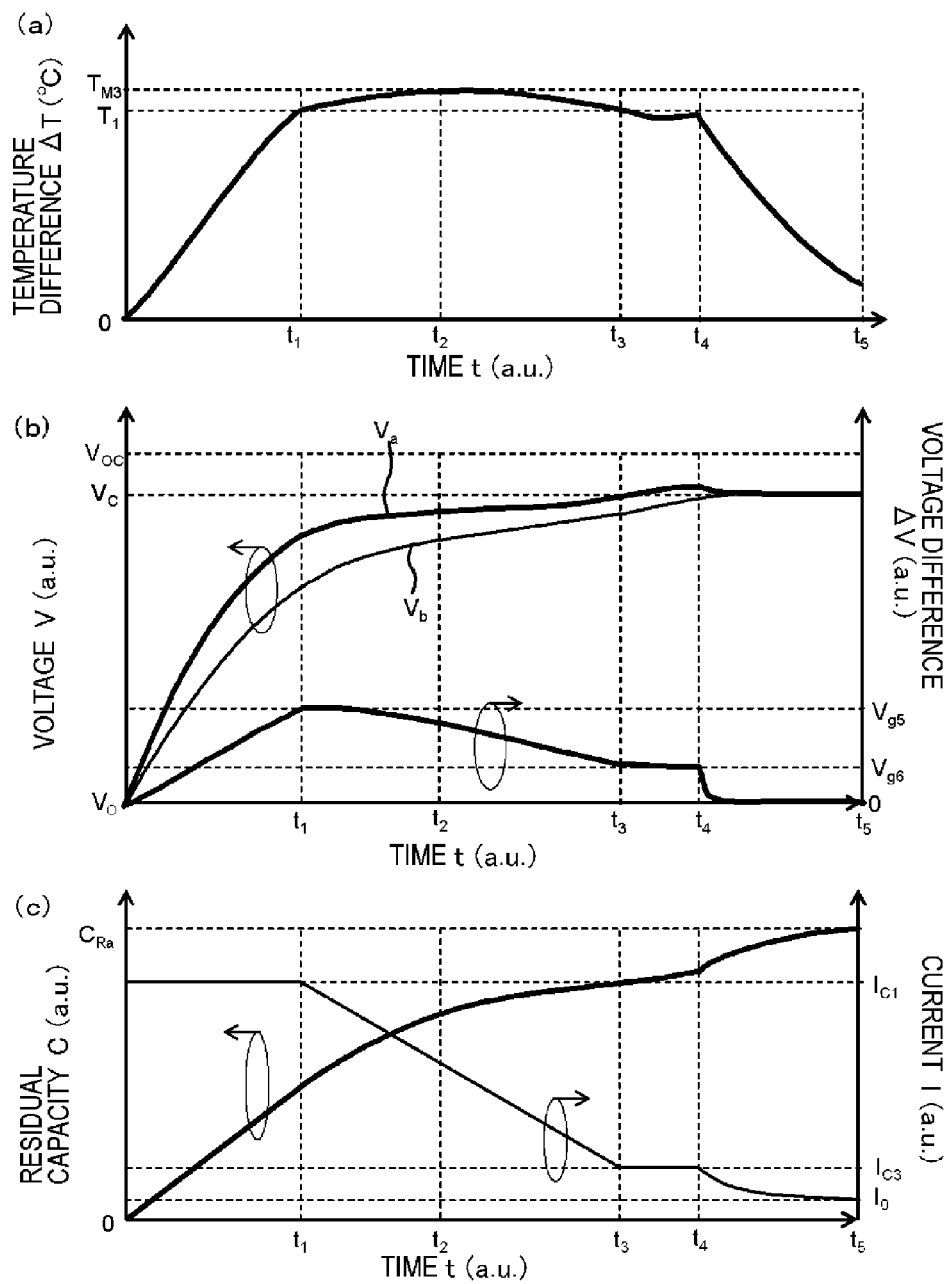
FIG. 17 is a diagram illustrating a control method according to an eighth embodiment.

A battery pack 10 according to an eighth embodiment will be described with reference to FIGS. 7 and 17. The eighth embodiment is the same as the seventh embodiment, except that control based on the voltage difference is not performed. Meanwhile, the "load control unit" in FIG. 7 is replaced by the "charge control unit". In addition, time t and the like of FIG. 15 are independent of time t and the like in the above-mentioned embodiment. Hereinafter, a detailed description will be given.

In the seventh embodiment, a description has been given in which the battery control unit 400 transmits the first signal, and then the battery control unit 400 and the charge control unit 940 perform control on the basis of the voltage difference ΔV between the highest temperature cell and the lowest temperature cell. However, as described in the eighth embodiment, the battery control unit 400 can also perform control on the basis of only the temperature difference ΔT.

In addition, in the second embodiment, a case will be described in which the temperature difference ΔT between the highest temperature cell and the lowest temperature cell increases over time. Specifically, the battery pack 10 may include a large number of battery cells 100, and be used under the low-temperature environment. That is, in the inside battery cell 100 within the battery pack 10, heat is not likely to escape during the generation of heat, whereas in the outside battery cell 100 of the battery pack 10, heat has a tendency to dissipate to the outside.

First, in the flow diagram of FIG. 7, the charge of the battery cells 100 is started (S110). Next, the battery control unit 400 specifies the lowest temperature cell having the lowest temperature and the highest temperature cell having the highest temperature on the basis of the temperature measured by the temperature measurement unit 300 (S120).

Here, FIG. 17(a) shows a relationship between the time from the charge start time, and the temperature difference ΔT between the highest temperature cell and the lowest temperature cell in the eighth embodiment. FIG. 17(b) shows a relationship between the time from the charge start time, and the voltage $V_a$ of the lowest temperature cell and the voltage $V_b$ of the highest temperature cell in the eighth embodiment. In addition, the drawing shows a relationship between the time from the discharge start time, and the voltage difference ΔV between the voltage $V_b$ of the highest temperature cell and the voltage $V_a$ of the lowest temperature cell in the eighth embodiment. In addition, FIG. 17(c) shows a relationship between the time from the charge start time and the current and residual capacity of the battery cell 100 in the eighth embodiment.

As shown in FIG. 17(c), until time $t_1$, charge at a constant current is performed by the charge control unit 940. That is, the current of all the battery cells 100 is kept constant at the constant current value $I_{C1}$.

As shown in FIG. 17(a), for example, a rise in the temperature of the highest temperature cell is fast. On the other hand, a rise in the temperature of the lowest temperature cell is slow. The temperature difference ΔT between the highest temperature cell and the lowest temperature cell increases monotonically, for example, simultaneously with the charge start.

As shown in FIG. 17(b), from the charge start, the voltage $V_a$ of the lowest temperature cell rises faster than the voltage $V_b$ of the highest temperature cell due to a difference in internal resistance. For this reason, the voltage difference ΔV between the highest temperature cell and the lowest temperature cell increases.

Here, in FIG. 17(a), at time $t_1$, the temperature difference ΔT between the highest temperature cell and the lowest temperature cell becomes the reference value $T_1$. In this manner, when the first condition in which the temperature difference ΔT between the highest temperature cell and the lowest temperature cell is equal to or greater than the reference value $T_1$ is satisfied (S130; Yes), the battery control unit 400 outputs the first signal (S140).

In addition, as shown in FIG. 17(b), at time $t_1$, the voltage difference ΔV between the highest temperature cell and the lowest temperature cell increases up to $V_{g5}$.

Here, the battery control unit 400 and the charge control unit 940 perform control based on the temperature difference ΔT between the highest temperature cell and the lowest temperature cell, as follows.

The charge control unit 940 reduces a current at time $t_1$ when the first signal is received from the battery control unit 400 (S510).

In FIG. 17(c), after time $t_1$, the charge control unit 940 reduces a current. For example, as is the case with the first embodiment, the charge control unit 940, for example, reduces a current linearly. Meanwhile, even when the amount of current reduction of the charge control unit 940 is arbitrary, it is possible to obtain the same effect.

In addition, as shown in FIG. 17(a), immediately after time $t_1$, the highest temperature cell maintains the temperature to be high due to the generation of heat caused by the discharge. For this reason, the charge control unit 940 reduces a current in S510, and thus the temperature difference ΔT between the highest temperature cell and the lowest temperature cell is not reduced immediately. On the other hand, the current is reduced by the charge control unit 940, and thus an increase in temperature difference ΔT becomes gentle after time $t_1$.

In FIG. 17(b), after time $t_1$, the charge control unit 940 reduces the current, and thus a component due to the internal resistance is reduced. That is, after time $t_1$, the voltage $V_a$ of the lowest temperature cell comes close to the voltage $V_b$ of the highest temperature cell.

Next, after the first signal is output, the battery control unit 400 determines again the first condition in which the temperature difference ΔT between the highest temperature cell and the lowest temperature cell is equal to or greater than the reference value $T_1$ (S520).

After time $t_1$, when the temperature difference ΔT satisfies the first condition (S520; Yes), the load control unit 640 continues control for reducing the current (S510).

As shown in FIG. 17(a), further, the charge control unit 940 performs control for reducing the current, and thus the heat generation of the entire battery pack 10 is suppressed. Thereby, an increase in temperature difference ΔT can be made gentle. At time $t_2$, the temperature difference ΔT becomes a maximum value $T_{M3}$. Further, after time $t_2$, the temperature difference ΔT drops gently in association with a further reduction in current in the discharge.

As shown in FIG. 17(c), even after time $t_2$, the load control unit 640 continues control for reducing a current.

As shown in FIG. 17(b), even after time $t_2$, the voltage $V_a$ of the lowest temperature cell gradually comes close to the voltage $V_b$ of the highest temperature cell.

As shown in FIG. 17(a), further, the load control unit 640 performs the control for reducing a current, and thus the temperature difference $\Delta T$ becomes less than the reference value $T_1$ at time $t_3$. That is, the temperature difference $\Delta T$ does not satisfy the first condition.

Next, As in a case of time $t_3$, when the first signal is output, and then the first condition in which the temperature difference $\Delta T$ is equal to or greater than the reference value $T_1$ is not satisfied (S520; No), the battery control unit 400 stops the first signal (S530). Accordingly, the charge control unit 940 stops the control for reducing a current.

As shown in FIG. 17(c), after time $t_3$, for example, the charge control unit 940 performs control so that the current is kept constant at the constant current value $I_{C3}$.

As shown in FIG. 17(b), after time $t_3$, the voltages of the lowest temperature cell and the highest temperature cell rise in association with an increase in residual capacity.

Next, it is determined whether the charge of the battery pack 10 is continued (S180). When the charge is continued (S180; Yes), the battery control unit 400 controls the battery pack 10 again on the basis of the temperature difference $\Delta T$ between the highest temperature cell and the lowest temperature cell. When the temperature difference $\Delta T$ increases due to a change in the usage environment of the battery pack 10, or the like, the same control as described above is performed.

In FIG. 17(b), the voltage of the battery cell 100 rises by further performing the charge. At time $t_4$, the charge control unit 940 performs switching from constant current charge to constant voltage charge.

In FIG. 17(c), after time $t_4$, the charge control unit 940 gradually reduces the charge current from $I_{C3}$. At time $t_5$, the residual capacities of all the cells reach the full charge capacity value $C_{Ra}$. In addition, at time $t_5$, the current of the maximum voltage cell reaches a charge termination current value $I_0$. Therefore, at time $t_5$, the charge control unit 940 terminates the charge (S190).

As described above, the battery pack 10 according to the seventh embodiment is controlled.

According to the eighth embodiment, it is also possible to obtain the same effect as that in the first, second or seventh embodiments in the charge. Further, according to the eighth embodiment, the battery control unit 400 and the load control unit 640 can perform control on the basis of only the temperature difference $\Delta T$. The eighth embodiment is particularly effective, for example, in a case where the temperature difference $\Delta T$ increases over time, or the like. In addition, the eighth embodiment can be applied even to a case where a difference in initial full charge capacity in the battery cells 100 is present.

Further, according to the eighth embodiment, the current in the discharge is reduced by the load control unit 640, and thus it is possible to reduce the temperature difference $\Delta T$ between each of the battery cells 100. That is, it is possible to suppress the increase of a difference in internal resistance between each of the battery cells 100 due to the temperature difference $\Delta T$.

Ninth Embodiment

Figure 18:
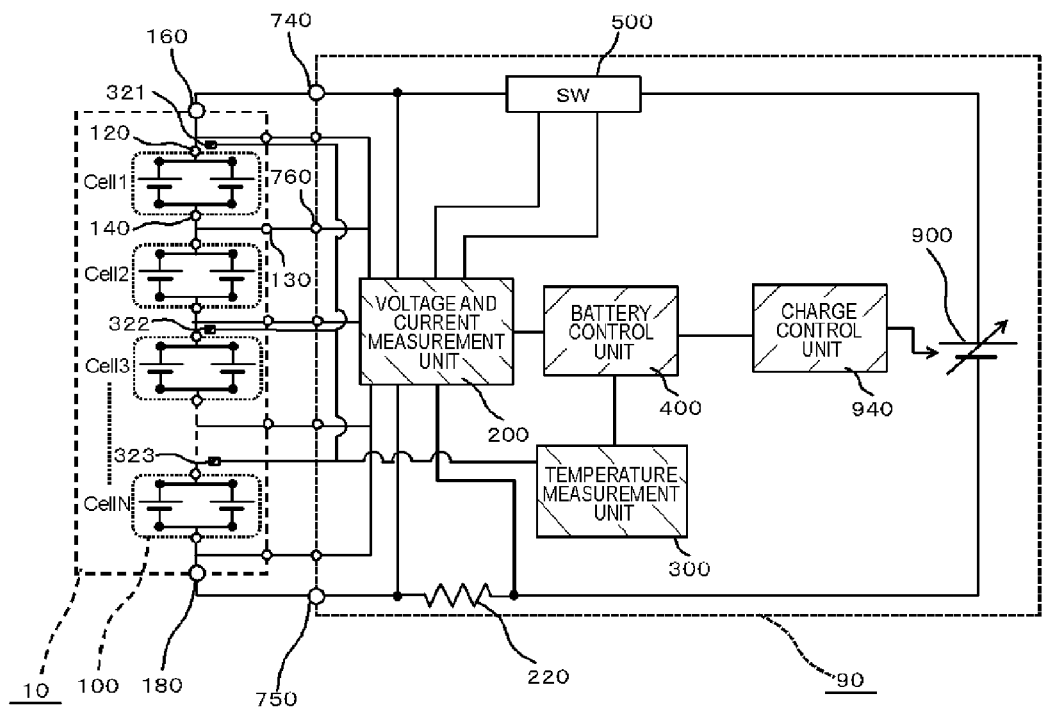
FIG. 18 is a circuit diagram illustrating a configuration of a battery pack and a charger according to a ninth embodiment.

FIG. 18 is a circuit diagram illustrating a configuration of a battery pack 10 and a charger 90 according to a ninth embodiment. The ninth embodiment is the same as the seventh embodiment, except that the control circuit 20 of the battery pack 10 in the seventh embodiment is included in the charger 90. Hereinafter, a detailed description will be given.

As shown in FIG. 18, the battery pack 10 of the ninth embodiment is not provided with the control circuit 20. That is, the battery pack 10 includes only a plurality of battery cells 100 which are connected in series to each other. The positive electrode terminal 160 is provided on the side of Cell 1 of the battery pack 10. On the other hand, the negative electrode terminal 180 is provided on the side of Cell N of the battery pack 10. In addition, a battery cell terminal 130 is provided between each of the battery cells 100.

The charger 90 of the ninth embodiment includes the voltage and current measurement unit 200, the temperature measurement unit 300, the battery control unit 400 and the switch 500 in addition to the charge control unit 940. The measurement terminal 760 is provided on the battery pack 10 side of the charger 90.

In addition, the positive electrode terminal 740 and the negative electrode terminal 750 are provided on the battery pack 10 side of the charger 90. The positive electrode terminal 740 and negative electrode terminal 750 of the charger 90 are respectively connected to the positive electrode terminal 160 and the negative electrode terminal 180 of the battery pack 10. Thereby, the charger 90 can charge the battery pack 10.

The temperature sensor 321, the temperature sensor 322 and the temperature sensor 323 of the temperature measurement unit 300 are inserted from an opening (not shown) provided to an exterior body (not shown) of the battery pack 10, and are installed on each of the battery cells 100.

In addition, the voltage and current measurement unit 200 is connected to the measurement terminal 760. The measurement terminal 760 of the charger 90 is connected to the battery cell terminal 130 of the battery pack 10 through an interconnect (no sign shown). Thereby, the voltage and current measurement unit 200 can measure the voltage of each of the battery cells 100.

According to the ninth embodiment, it is possible to obtain the same effect as that in the seventh embodiment. Further, according to the ninth embodiment, it is possible to simplify the battery pack 10 which is frequently exchanged.

In the aforementioned embodiments, the battery control unit 400 may output the first signal in response to both the case where the discharge of the battery cells 100 is performed and the case where the charge of the battery cells 100 is performed.

In the aforementioned embodiments, a case has been described in which the battery control unit 400 transmits a signal to the switch 500 through the voltage and current measurement unit 200, but the battery control unit 400 may transmit a signal directly to the switch 500.

As described above, although the embodiments of the present invention have been set forth with reference to the drawings, they are merely illustrative of the present invention, and various configurations other than those stated above can be adopted. For example, in the above embodiments, a case where the battery cell 100 is a laminate-type battery has been described, but the effect of the present invention can be obtained similarly even when the battery cell 100 is a battery having other forms such as a cylindrical shape and a square shape.

The invention claimed is:
1. A battery control system comprising:
   a temperature measurement unit that measures temperatures of two or more battery units of a plurality of battery units which are connected in series to each other; and a battery control unit that controls charge and discharge of the battery units on the basis of the temperatures measured by the temperature measurement unit, wherein the battery control unit specifies a lowest temperature unit in which the temperature is lowest and a highest temperature unit in which the temperature is highest, on the basis of the temperatures measured by the temperature measurement unit, when the charge of the battery unit is performed or the discharge of the battery unit is performed, continues the charge or the discharge as it is when a first condition in which a temperature difference between the highest temperature unit and the lowest temperature unit is equal to or greater than a reference value is not satisfied, and outputs a first signal when the temperature difference satisfies the first condition.

2. The battery control system according to claim 1, further comprising a voltage measurement unit that measures voltages of the battery units, wherein the battery control unit stops outputting the first signal when the first signal is output and then a voltage difference between the highest temperature unit and the lowest temperature unit becomes equal to or less than a first reference voltage value.

3. The battery control system according to claim 2, wherein the first signal includes a voltage difference signal indicating the voltage difference.

4. The battery control system according to claim 2, wherein the battery control unit outputs a second signal which is different from the first signal when the first signal is stopped and then the voltage difference is becomes equal to or less than a second reference voltage value lower than the first reference voltage value.

5. The battery control system according to claim 1, wherein the battery control unit changes the reference value of the temperature difference in the first condition on the basis of the temperatures of the battery unit.

6. The battery control system according to claim 5, wherein the reference value of the temperature difference becomes smaller as the temperature of the lowest temperature unit or the highest temperature unit becomes lower.

7. The battery control system according to claim 1, wherein the first signal includes a temperature difference signal indicating the temperature difference.

8. The battery control system according to claim 1, wherein the first signal includes a temperature signal indicating the temperature of at least one battery unit out of the lowest temperature unit and the highest temperature unit.

9. The battery control system according to claim 1, wherein the temperature measurement unit further measures a temperature of outside air, and the first signal includes an outside air temperature signal indicating the temperature of outside air.

10. The battery control system according to claim 1, wherein the battery control unit stops outputting the first signal when the first signal is output and then the temperature difference does not satisfy the first condition.

11. The battery control system according to claim 1, wherein the temperature measurement unit measures the temperatures of:

at least one battery unit which is disposed at the outermost side; and the battery unit which is located further inside than the at least one battery unit.

12. The battery control system according to claim 1, further comprising a load control unit, connected to the battery control unit, which receives the first signal and controls a load consuming power of the discharge, wherein the load control unit reduces a current in the discharge when the first signal is received from the battery control unit.

13. The battery control system according to claim 12, further comprising a voltage measurement unit that measures voltages of the battery units wherein the first signal includes a voltage difference signal indicating the voltage difference between the highest temperature unit and the lowest temperature unit, the load control unit reduces the current until the voltage difference becomes equal to or less than the first reference voltage value, on the basis of the voltage difference signal, when the first signal is received, and the battery control unit stops outputting the first signal when the first signal is output and then the voltage difference becomes equal to or less than the first reference voltage value.

14. The battery control system according to claim 13, wherein the battery control unit outputs a second signal which is different from the first signal when the first signal is stopped and then the voltage difference becomes equal to or less than a second reference voltage value lower than the first reference voltage value, and the load control unit can increase the current when the second signal is received.

15. The battery control system according to claim 12, wherein the first signal includes a temperature difference signal indicating the temperature difference, and the load control unit performs control so that the current is reduced as the temperature difference becomes larger, on the basis of the temperature difference signal, when the first signal is received.

16. The battery control system according to claim 12, wherein the first signal includes a temperature signal indicating the temperature of at least one battery unit out of the lowest temperature unit and the highest temperature unit, and the load control unit performs control so that the current is reduced as the temperature becomes lower, when the first signal is received.

17. The battery control system according to claim 12, wherein the temperature measurement unit further measures a temperature of outside air, the first signal includes an outside air temperature signal indicating the temperature of outside air, and the load control unit performs control so that the current is reduced as the temperature of outside air becomes lower, when the first signal is received.

18. The battery control system according to claim 12, wherein the load control unit performs control so that the current becomes equal to or less than a present current value, when the first signal is stopped.

19. The battery control system according to claim 1, wherein the battery unit includes a lithium-ion secondary battery.

20. A battery pack comprising:

a plurality of battery units which are connected in series to each other;

a temperature measurement unit that measures temperatures of two or more battery units; and a battery control unit that controls charge and discharge of the battery units on the basis of the temperatures measured by the temperature measurement unit, wherein the battery control unit specifies a lowest temperature unit in which the temperature is lowest and a highest temperature unit in which the temperature is highest, on the basis of the temperatures measured by the temperature measurement unit, when the charge of the battery unit is performed or the discharge of the battery unit is performed, continues the charge or the discharge as it is when a first condition in which a temperature difference between the highest temperature unit and the lowest temperature unit is equal to or greater than a reference value is not satisfied, and outputs a first signal when the temperature difference satisfies the first condition.

21. An electronic device comprising:
a battery pack including a plurality of battery units which are connected in series to each other;
a temperature measurement unit that measures temperatures of two or more battery units;
a battery control unit that controls discharge of the battery units on the basis of the temperatures measured by the temperature measurement unit;
a load that consumes power of the discharge from the battery pack; and
a load control unit, connected to the battery control unit, which controls the load,
wherein the battery control unit
specifies a lowest temperature unit in which the temperature is lowest and a highest temperature unit in which the temperature is highest, on the basis of the temperatures measured by the temperature measurement unit, when the discharge of the battery unit is performed,
continues the charge or the discharge as it is when a first condition in which a temperature difference between the highest temperature unit and the lowest temperature unit is equal to or greater than a reference value is not satisfied, and
outputs a first signal when the temperature difference satisfies the first condition, and
the load control unit reduces a current in the discharge when the first signal is received from the battery control unit.

22. The electronic device according to claim 21, further comprising a voltage measurement unit that measures voltages of the battery units,
wherein the battery control unit stops outputting the first signal when the first signal is output and then a voltage difference between the highest temperature unit and the lowest temperature unit becomes equal to or less than a first reference voltage value.

23. The electronic device according to claim 21, wherein the load includes at least one or more light-emitting units, and
the load control unit reduces the current by lowering luminance of the light-emitting unit when the first signal is received from the battery control unit.

24. The electronic device according to claim 21, wherein the load includes at least one or more arithmetic operation process units, and
the load control unit reduces the current by lowering a processing speed of the arithmetic operation process unit when the first signal is received from the battery control unit.

25. The electronic device according to claim 21, wherein the electronic device is a portable communication terminal that performs a phone call or packet communication,
the load includes a communication unit that performs the communication, and
the load control unit reduces the current by controlling the communication unit so as to restrict the phone call and perform only the packet communication when the first signal is received from the battery control unit.

26. The electronic device according to claim 21, wherein the load includes at least one or more electric drive units, and
the load control unit reduces the current by reducing the power which is supplied to the electric drive unit when the first signal is received from the battery control unit.

27. The electronic device according to claim 21, further comprising a fuel drive unit which is driven by fuel,
wherein the load is at least one or more electric drive units, and
the load control unit reduces the current by reducing a power supply amount from the battery pack to the electric drive unit and increasing a drive ratio in the fuel drive unit, when the first signal is received from the battery control unit.

28. The electronic device according to claim 21, which is connected to at least one or more power supply units other than the battery pack,
wherein the load control unit reduces a power supply amount from the battery pack to the load and increases the power supply amount from the power supply unit to the load when the first signal is received from the battery control unit.

29. The electronic device according to claim 21, wherein the load control unit monotonically reduces the current consumed in the load when the first signal is received from the battery control unit.

30. The electronic device according to claim 21, further comprising a plurality of the loads,
wherein the load control unit reduces the number of loads that presently consume the power when the first signal is received from the battery control unit.

31. A charger comprising:
a temperature measurement unit that measures temperatures of two or more battery units of a plurality of battery units which are connected in series to each other;
a battery control unit that controls charge of the battery units on the basis of the temperatures measured by the temperature measurement unit; and
a charge control unit, connected to the battery control unit, which controls a voltage and a current in the charge,
wherein the battery control unit
specifies a lowest temperature unit in which the temperature is lowest and a highest temperature unit in which the temperature is highest, on the basis of the temperatures measured by the temperature measurement unit, when the charge of the battery unit is performed,
continues the charge or the discharge as it is when a first condition in which a temperature difference between the highest temperature unit and the lowest temperature unit is equal to or greater than a reference value is not satisfied, and
outputs a first signal when the temperature difference satisfies the first condition, and
the charge control unit reduces the current in the charge when the first signal is received from the battery control unit.

32. The charger according to claim 31, further comprising a voltage measurement unit that measures voltages of the battery units,
wherein the battery control unit stops outputting the first signal when the first signal is output and then a voltage difference between the highest temperature unit and the lowest temperature unit becomes equal to or less than a first reference voltage value.

* * * * *